United States Patent
Blom et al.

(10) Patent No.: US 11,887,156 B2
(45) Date of Patent: *Jan. 30, 2024

(54) DYNAMICALLY VARYING REMARKETING BASED ON EVOLVING USER INTERESTS

(71) Applicant: Google LLC, Mountain View, CA (US)

(72) Inventors: Jan Blom, Saratoga, CA (US); Emre Demiralp, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,712

(22) Filed: Sep. 23, 2022

(65) Prior Publication Data

US 2023/0017443 A1 Jan. 19, 2023

Related U.S. Application Data

(63) Continuation of application No. 17/363,914, filed on Jun. 30, 2021, now Pat. No. 11,481,804, which is a
(Continued)

(51) Int. Cl.
*G06Q 30/02* (2023.01)
*G06Q 30/0251* (2023.01)
(Continued)

(52) U.S. Cl.
CPC ....... *G06Q 30/0254* (2013.01); *G06Q 10/067* (2013.01); *G06Q 30/0246* (2013.01)

(58) Field of Classification Search
CPC ............... G06Q 30/02; G06Q 30/0207; G06Q 30/0254; G06Q 10/067; G06Q 30/0246
See application file for complete search history.

(56) References Cited

U.S. PATENT DOCUMENTS

| 9,658,739 | B1 * | 5/2017 | Freund | G06F 3/04817 |
| 10,373,209 | B2 * | 8/2019 | Maycotte | G06Q 30/0242 |

(Continued)

FOREIGN PATENT DOCUMENTS

| CA | 2898112 A1 * | 7/2014 | G06F 15/16 |
| EP | 2821950 A1 * | 1/2015 | G06Q 30/00 |

(Continued)

OTHER PUBLICATIONS

P. Johnson; N. Kristoff;H. McGinness;P. Vu;n. Wong;J. Wright;W.T. Scherer;M.W. Burkett, Startegic Online Advertising: modeling Internet User Behavior with Advertising.com (English), 2006IEEEE Systems and information Engineering Design Symposium (pp. 162-167), Jan. 8, 2009 (Year: 2009).*

(Continued)

*Primary Examiner* — Marilyn G Macasiano
(74) *Attorney, Agent, or Firm* — Fish & Richardson P.C.

(57) ABSTRACT

Systems and methods of dynamically varying the intensity of providing content items in a remarketing campaign based on tracking client device interactions are provided. The system can assign an account identifier to a first segment for a pre-conversion model, responsive to receiving a first interaction associated with a content provider from a client device. The system can assign the account identifier to a second segment for the pre-conversion model, responsive to receiving a second interaction. The system can assign the account identifier to a third segment, responsive to receiving a third interaction. The third interaction can include a conversion event. The system can generate a post-conversion model based on the third segment and the pre-conversion model. The system can determine an intent index for the account identifier based on the post-conversion model. The system can store the account identifier into an interest cluster based on the intent index.

20 Claims, 15 Drawing Sheets

Related U.S. Application Data continuation of application No. 14/834,139, filed on Aug. 24, 2015, now Pat. No. 11,087,356.

(51) Int. Cl.
  *G06Q 30/0242* (2023.01)
  *G06Q 10/067* (2023.01)

(56) References Cited

U.S. PATENT DOCUMENTS

| | | | |
|---|---|---|---|
| 11,086,942 B2* | 8/2021 | Blue | G06F 16/951 |
| 11,087,356 B2 | 8/2021 | Blom et al. | |
| 2006/0293957 A1 | 12/2006 | Petersen et al. | |
| 2010/0114654 A1 | 5/2010 | Lukose et al. | |
| 2010/0262456 A1 | 10/2010 | Feng et al. | |
| 2011/0231246 A1 | 9/2011 | Bhatia et al. | |
| 2011/0258041 A1 | 10/2011 | Ioffe et al. | |
| 2012/0041792 A1* | 2/2012 | Priyadarshan | G06Q 30/0251 705/5 |
| 2012/0042262 A1* | 2/2012 | Priyadarshan | G06Q 30/0269 715/745 |
| 2012/0136714 A1 | 5/2012 | Nesamoney et al. | |
| 2013/0054355 A1 | 2/2013 | Raza et al. | |
| 2013/0124309 A1 | 5/2013 | Traasdahl et al. | |
| 2013/0204700 A1* | 8/2013 | Synett | G06Q 30/0202 705/14.69 |
| 2013/0238460 A1 | 9/2013 | Green | |
| 2014/0122245 A1 | 5/2014 | Qu et al. | |
| 2014/0244345 A1 | 8/2014 | Sollis et al. | |
| 2014/0297394 A1 | 10/2014 | Li et al. | |
| 2015/0193811 A1 | 7/2015 | Lei et al. | |
| 2016/0117740 A1 | 4/2016 | Linden | |
| 2016/0253679 A1* | 9/2016 | Venkatraman | G06Q 30/0185 705/310 |
| 2017/0061478 A1 | 3/2017 | Blom et al. | |

FOREIGN PATENT DOCUMENTS

| | | | |
|---|---|---|---|
| WO | WO 2012/141731 A1 * | 10/2012 | G06Q 50/00 |
| WO | WO 2017/100588 A1 * | 6/2014 | G06Q 30/02 |
| WO | WO 2017/139042 | 8/2017 | |

OTHER PUBLICATIONS

Limbeck, P.; Suntinger, M.; Schiefer, J., Sari OpenRec—Empowering Recommendation Systems with Business Events (English), 2010 Second International Conference on Advances in Databases, Knowledge, and Data Applications (pp. 111-119), Apr. 1, 2010 (Year: 2010).*

P. Johnson; N. Kristoff; H. McGuinness; P. Vu; N. Wong; J. Wright; W.T. Scherer; M.W. Burkett, Strategic Online Advertising: Modelling Internet User Behavior with Advertising.com (English), 2006 IEEE Systems and Information Engineering Design Symposium (pp. 162-167), Jan. 8, 2009 (Year: 2009).*

IP.com [online], "Methods, Systems and media for messaging targeted users," The IP.com Prior Art Database, May 16, 2014, 12 pages.

* cited by examiner

DYNAMICALLY VARYING REMARKETING BASED ON EVOLVING USER INTERESTS

CROSS REFERENCE TO RELATED APPLICATION

This patent application is a continuation of, and claims the benefit of priority under 35 USC 120 of, U.S. patent application Ser. No. 17/363,914, filed Jun. 30, 2021, which application is a continuation of, and claims the benefit of priority under 35 USC 120 of, U.S. patent application Ser. No. 14/834,139, now U.S. Pat. No. 11,087,356, filed Aug. 24, 2015. The disclosures of the prior applications are considered part of and are incorporated by reference in the disclosure of this application.

BACKGROUND

In a computer networked environment such as the internet, entities such as people or companies provide information for public display on web pages or other online documents. The documents can include information provided by the entities via a computing, device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a method of dynamically varying the intensity of providing content items in a remarketing campaign based on tracking client device interactions. The method can include assigning, responsive to receiving a first interaction from a client device, an account identifier to a first segment for a pre-conversion model. The client device can be associated with the account identifier. The first interaction can be associated with a content provider. The method can include assigning, responsive to receiving a second interaction from the client device, account identifier to a second segment for the pre-conversion model. The second segment can include a subset of the first segment. The method can include assigning, responsive to receiving a third interaction from the client device, the account identifier to a third segment. The third interaction can include a conversion event associated with the content provider. The third segment can be indicative of the conversion event and can include a subset of the second segment. The method can include generating a post-conversion model based on the third segment and the pre-conversion model. The method can include determining an intent index for the account identifier based on the post-conversion model. The method can include storing the account identifier into an interest cluster based on the intent index.

At least one aspect is directed to a system for dynamically varying the intensity of providing content items in a remarketing campaign based on tracking client device interactions. The system can include an interaction cataloguer module and an intent predictor module. The interaction cataloguer module can be executed on a data processing system having one or more processors. The interaction cataloguer module can be configured to assign an account identifier to a first segment for a pre-conversion model, responsive to receiving a first interaction from a client device. The client device can be associated with the account identifier. The first interaction can be associated with a content provider. The interaction cataloguer module can be configured to assign the account identifier to a second segment for the pre-conversion model, responsive to receiving a second interaction from the client device. The second segment can include a subset of the first segment. The interaction cataloguer module can be configured to assign the account identifier to a third segment, responsive to receiving a third interaction from the client device, by the interaction cataloguer module. The third interaction can include a conversion event associated with the content provider. The third segment can be indicative of the conversion event and can include a subset of the second segment. The intent predictor module can be executed on the data processing system. The intent predictor module can be configured to generate a post-conversion model based on the third segment and the pre-conversion model. The intent predictor module can be configured to determine an intent index for the account identifier based on the post-conversion model. The intent predictor module can be configured to store the account identifier into an interest cluster based on the intent index.

At least one aspect is directed to a computer readable storage medium storing instructions that when executed by one or more data processors, cause the one or more data processors to perform operations. The operations can assign, responsive to receiving a first interaction from a client device, an account identifier to a first segment for a pre-conversion model. The client device can be associated with the account identifier. The first interaction can be associated with a content provider. The operations can assign, responsive to receiving a second interaction from the client device, account identifier to a second segment for the pre-conversion model. The second segment can include a subset of the first segment. The operations can assign, responsive to receiving a third interaction from the client device, the account identifier to a third segment. The third interaction can include a conversion event associated with the content provider. The third segment can be indicative of the conversion event and can include a subset of the second segment. The operations can generate a post-conversion model based on the third segment and the pre-conversion model. The operations can determine an intent index for the account identifier based on the post-conversion model. The operations can store the account identifier into an interest cluster based on the intent index.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

Figure 1:
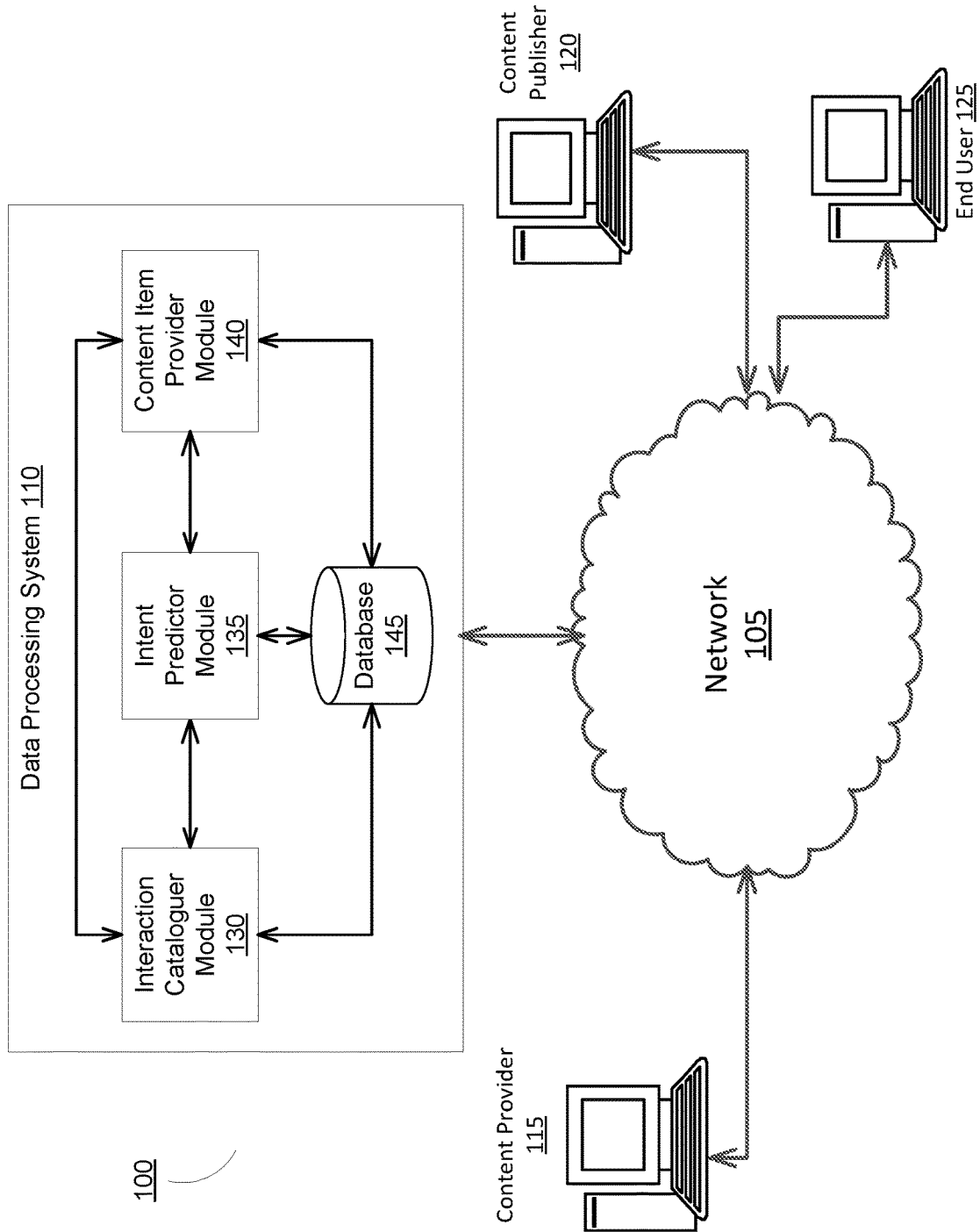
FIG. 1 is a block diagram depicting, one implementation of an environment for dynamically varying the intensity of providing content items in a remarketing campaign based on tracking client device interactions in a computer network environment, according to an illustrative implementation.

Following below are more detailed descriptions of various concepts related to, and implementations of, methods, apparatuses, and systems of providing information via a computer network. The various concepts introduced above and discussed in greater detail below may be implemented in any of numerous ways, as the described concepts are not limited to any particular manner of implementation.

DETAILED DESCRIPTION

The present disclosure is generally directed to varying the intensity of providing content in a remarketing campaign based on the user's evolving interests. The present disclosure described herein relies on a pre-conversion model and post-conversion model to calculate a shopping intent index (SII) for a particular user to determine how and when to provide content items for display.

Advertisers are challenged with attempting to understand how to retain user interest in their advertised products or services after the user's initial conversion during their remarketing campaign phase. Some users may continue to be interested in the advertiser's products or services after their initial conversion. However, other users may no longer be interested in the advertised products or services subsequent to the initial conversion. For the latter subset of users, continually providing advertisements of the same advertiser may even adversely affect their impression of the advertiser. The pre-conversion model and post-conversion model can leverage user interactions and other information tracked over a multiplicity of users to determine the SIT for a particular user. From a psychological perspective, the SII can represent the interest or intent expressed by the user with regards to product or service advertised by the advertiser. From a human-computer interaction perspective, the SII can represent the likelihood or probability of the end user computing device associated with the user interacting again with an advertisement or webpage of the advertiser.

More specifically, the pre-conversion model and the post-conversion model can be of the form $f(x_1, x_2, \ldots x_N)$, where $x_1, x_2, \ldots x_N$ each represent a SII interaction term for a specified user segment determined using various artificial intelligence techniques such as neural networks and deep learning, among others. Each term may take into account exogenous factors, such as time of day, day of week, and weather patterns, among others. As the system accumulates more data about the user, the system can assign the user to segments of finer granularity. Mathematically, the model $f(x_1, x_2, \ldots x_N)$ can be viewed as an approximation of a high-dimensional model representation or a Volterra expansion with $2^N$ dependencies to account for the cold start problem, namely the lack of sufficient data particular to the user.

Chronologically, when a user first interacts with an advertisement or other content associated with the advertiser, the system can instantiate a pre-conversion model assigning the user to a general user segment parameter, $x_1$. The system can then track the subsequent user interactions with the advertisement, and other content associated with the advertiser, such as click throughs, hover overs, revisits of a website, writing reviews, and physical visits of the user. As more and more user interactions from and data about the user are aggregated, the system can assign ever more granular segments and terms to the user $x_2 \ldots x_N$. The term $x_2$ can, for example, represent users that have performed a search query for the advertiser's products. Finally, when the user converts however defined by the advertiser (e.g., purchase of an advertiser's product) or determined by the system, the system can assign the user to the conversion term $x_C$. To determine conversion influences of the parameters, the system can instantiate a separate model of the form $f'(x'_1, x'_2)$, where $x'_1$ and $x'_2$ are the respective subsets of user segments as $x_1$ and $x_2$ that have converted. Using these calculations, the system can generate the post-conversion model, $f(x_1, x_2, \ldots x_C)$, based on $f'(x'_1, x'_2)$ and $x_C$. Using these terms, the system can generate the overall SII for the particular user at the particular sampled time.

Based on the SII, the system can determine which advertisements to select for display and determine how to serve or otherwise provide the selected advertisement at the end user computing device. Advertisement serving parameters can include the frequency of displaying the advertisement, time frame at which to display the advertisement, and size at which to display the advertisement, among others. For example, if a user has a high SII for a given advertiser, the system can select one advertisement of the advertiser and provide the advertisement for display 8 to 10 times per week as a full screen interstitial advertisement.

FIG. 1 illustrates an example system 100 for dynamically varying the intensity of providing content items in a remarketing campaign based on tracking client device interactions via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for example with at least one content provider computing device 115, at least one content publisher computing device 120, or at least one end user computing device 125.

The data processing system 110 can include at least one server. For example, the data processing system 110 can include a plurality of servers located in at least one data center or server farm. The data processing system 110 can include at least one interaction cataloguer module 130, at least one intent predictor module 135, at least one content item provider module 140, and at least one database 145.

The interaction cataloguer module 130, the intent predictor module 135, and the content item provider module 140 can each include at least one processing unit, server, virtual server, circuit, engine, agent, or other logic device such as programmable logic arrays configured to communicate with the database 145 and with other computing devices (e.g., the content provider computing device 115, the content publisher computing device 120, or the end user computing device 125) via the network 105. The interaction cataloguer module 130, the intent predictor module 135, and the content item provider module 140 can include or execute at least one computer program or at least one script. The interaction cataloguer module 130, the intent predictor module 135, and the content item provider module 140 can be separate components, a single component, or part of the data processing system 110.

The content provider computing devices 115 can include servers or other computing devices operated by a content provider entity to provide content items such as advertisements for display on information resources at the end user computing device 125. The content provided by the content provider computing device 115 can include third party content items (e.g., ads) for display on information resources such as a website or web page that includes primary content, e.g. content provided by the content publisher computing device 120. The content items can also be displayed on a search results web page. For example, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For example, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing device 115. For example, the content publisher computing device 120 can operate the website of a company and can provide content about that company for display on, web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end, user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content server.

The interaction cataloguer module 130, the intent predictor module 135, and the content item provider module 140 can include combinations of software and hardware, such as one or more processors configured to execute one or more scripts to: (a) assign an account identifier associated with an end user computing device 125 to a first segment for a pre-conversion model; (b) assign the account identifier to a second segment for the pre-conversion model, responsive to receiving an interaction from the end user computing device 125; (c) assign the account identifier to a third segment, responsive to receiving a conversion interaction from the end user computing device 125; (d) generate a post-conversion model based on the third segment and the pre-conversion model; (e) determine an intent index for the account identifier based on the post-conversion model; and (f) store the account identifier into an interest cluster based on the intent index.

The data processing system 110 can also include one or more content repositories or databases 140. The databases 140 can be local to the data processing system 110. In some implementations, the databases 140 can be remote to the data processing system 110 but can communicate with the data processing system 110 via the network 105. The databases 140 can include, store, or otherwise contain web page, content items (e.g., advertisements), pre-conversion models for various user segments, post-conversion models for various user segments, intent index data for various user segments and for various items, and advertisement campaign management controls, among others. The pre-conversion models for various user segments, post-conversion models for various user segments, the intent indices for various user segments and the various items, and the advertisement campaign management controls can include those illustratively depicted in FIGS. 2A-2C, FIG. 3, and FIGS. 4A-4G. Additional details of the contents of the database 145 will be provided below.

The interaction cataloguer module 130 can be configured to assign an account identifier to a first segment for a pre-conversion model. The interaction cataloguer module 130 can be configured, to assign the account identifier to the first segment for the pre-conversion model, responsive to receiving a first interaction from the client device. An account identifier can include any identifier used to identify a user. For example, the account identifier can include an email, account number, or randomly generated numerical identifier. The account identifier can be associated with one or more end user computing devices 125. The first interaction can be associated with a content provider 115. For example, the first interaction can include an impression of an advertisement created by the content provider 115 shown on a webpage hosted by the content publisher 120. The first interaction can also be associated with a first item of the content provider 115. The first item can include a product, good, or service, or a plurality thereof, advertised by the content provider 115. For example, the first interaction can be associated with a line of headphone sets advertised by a digital audio provider. The first segment can include the general user segment. The general user segment can be stored and accessed from the database 145. For example, the general user segment may be over all users that have had an interaction with the content provider 115.

The interaction cataloguer module 130 can be configured to assign the account identifier to a second segment for the pre-conversion model, responsive to receiving a second interaction from the client device. The second segment can include a subset of the first segment. The interaction cataloguer module 130 can be configured to determine that the second interaction is one of a plurality of interactions. The plurality of interactions can be specified, predetermined, or otherwise predefined by the content provider 115. The interaction cataloguer module 130 can be configured to assign the account identifier to the second segment for the pre-conversion model, responsive to determining that the second interaction is one of the plurality of interactions. The plurality of interactions can include, for example, mouse-hover over a content item associated with the content provider 115, muting an audio or audiovisual content item associated with the content provider 115, visits or revisits of a webpage or website of the content provider 115 or content publisher 120, visits or revisits of a webpage or website containing information about the content provider 115, use of search queries containing terms associated with the content provider 115, writing reviews about the content provider 115 on webpages or websites such as social networking websites, making purchase orders online or offline for products or services associated with the content provider 115, and visits of a physical store location associated with the content provider 115, among others. The second interaction can also be associated with the first item of the content provider 115. The first item can include a product, good, or service, or a plurality thereof, advertised by the content provider 115. The second segment can include a subset user segment that may be associated with a particular location identifier, interaction type, device type of end user computing device 125, or applications used on the end user computing device 125, among others. For example, the second segment may define the user segment associated with location identifiers with the zip code 90210 and associated with tablets as the device type of the end user computing devices 125.

The interaction cataloguer module 130 can be configured to receive account data. The account data can include location identifier of the end user computing device 125 associated with the account identifier, information inputted by the user associated with the account identifier, and device type or specifications of the end user computing device 125, among others. The interaction cataloguer module 130 can be configured to assign the account identifier to the second segment for the pre-conversion model, responsive to receiving the account data associated with the account identifier. The interaction cataloguer module 130 can be configured to select the second segment from one or more segments for the pre-conversion model based on the account data, responsive to receiving the account data associated with the account identifier. The interaction cataloguer module 130 can be configured to assign the account identifier to the second segment for the pre-conversion model, responsive to the selection from the one or more segments for the pre-conversion model.

The interaction cataloguer module 130 can be configured to assign the account identifier to a third segment, responsive to receiving a third interaction from the end user computing device 125. The third, interaction can include a conversion event associated with the content provider 115. The third segment can be indicative of the conversion event. The third segment can also include a subset of the first segment or the second segment. The intent predictor module 135 can be configured to determine that the third interaction is a conversion event. The intent predictor module 135 can be configured to access a list of predefined conversion events from the database 145. The list of predefined conversion events can be defined by the content provider 115 or content publisher 120. The list of predefined conversion events can include placement of an order for a product or service associated with the content provider 115 or content publisher 120, and visit of the physical store location associated with the content provider 115 or content publisher 120, among others. The list of predefined conversion events can also include a plurality of interactions, including for example, mouse-hover over a content item associated with the content provider 115, muting an audio or audiovisual content item associated with the content provider 115, visits or revisits of a webpage or website of the content provider 115 or content publisher 120, visits or revisits of a webpage or website containing information about the content provider 115, use of search queries containing terms associated with the content provider 115, writing reviews about the content provider 115 on webpages or websites such as social networking websites, making purchase orders online or offline for products or services associated with the content provider 115, and visits of a physical store location associated with the content provider 115, among others. The third interaction can also be associated with the first item of the content provider 115. The first item can include a product, good, or service, or a plurality thereof, advertised by the content provider 115. The third segment can include a subset user segment that may be associated with a particular location identifier, interaction type, device type of end user computing device 125, or applications used on the end user computing device 125, among others. For example, the third segment may define the user segment associated with location identifiers with the State of California and associated with smartphones as the device type of the end user computing devices 125 that have converted. The list of predefined conversion events can also include interactions determined to have a statistically significant influence on the intent index. The intent predictor module 135 can be configured to determine that the third interaction is a conversion event based on the list of predefined conversion events.

The intent predictor module 135 can be configured to maintain the pre-conversion model. The pre-conversion model can include one or more interaction terms. Each of the interaction terms can correspond with a respective segment. Each of the interaction terms can include an intent index associated with the particular segment. The pre-conversion model can be implemented using, for example, an artificial neural network. This artificial neural network can include a plurality of input nodes, a plurality of hidden nodes, and a plurality of output nodes. Each input node can correspond to a different user segment and each can have the input of intent index fed back for the respective segment and exogenous factors. Exogenous factors can include, for example, time of day, day of week, holidays, changes in weather patterns, and stock prices, among others. Each output node can correspond to different user segment and output the intent index for the corresponding user segment. The weights for the connections between the nodes can be predefined or adaptively or iteratively tuned based on error propagation. Using the interaction terms, the pre-conversion model can also be implemented using, for example, linear regression, analysis of variance (ANOVA), Bayesian learning, deep learning, and other statistical machine learning techniques.

The intent predictor module 135 can be configured to generate a post-conversion model based on the third segment and the pre-conversion model. The intent predictor module 135 can be configured to segment, divide, partition, or otherwise limit a first segment subset and a second segment subset. The first segment subset and the second segment subset each can include the subset of the first segment that converted and the subset of the second segment that converted respectively. The first segment subset and the second segment subset each can include the subset of the first segment that have done the same interaction as the third interaction and the subset of the second segment that have done the same interaction as the third interaction respectively. The intent predictor module 135 can be configured to determine, measure, estimate or otherwise calculate a first influence measure for the subset of the first segment that converted and a second influence measure for the subset of the second segment that converted.

The intent predictor module 135 can be configured to determine a third interaction term, responsive to assigning the account identifier to the third segment. The intent predictor module 135 can be configured to generate the post-conversion model based on the one or more interaction terms. The intent predictor module 135 can be configured to generate the post-conversion model based a function of the one or more interaction terms. The intent predict module 135 can be configured to determine or otherwise generate the post-conversion model, responsive to receiving a fourth interaction from the end user computing device 125 or responsive to assigning the account identifier to a fourth segment. For example, suppose there are two user segments corresponding to two interactions by the end user computing devices 125 associated with the account identifier prior to the conversion event. In this example, the intent predictor module 135 can determine the statistical influence measures of each of the interaction terms to the intent index. The intent predictor module 135 can also wait until more interactions from the end user computing device 125 are received to gather more information about the account identifier in order to calculate higher order interaction terms between the two user segments. The intent predictor module 135 can then determine or generate the post-conversion model based on determining the statistical influence measures of each of the interaction terms to the intent index.

The intent predictor module 135 can be configured to determine or attribute which one of the previous interactions lead to the conversion event based on the post conversion model. The intent predictor module 135 can be configured to rank the one or more interaction terms of the post-conversion model. The intent predictor module 135 can be configured to determine, select, or otherwise identify the interaction event associated with the interaction term with the highest influence measure as the interaction event that lead to the conversion event. The intent predictor module 135 can be configured to determine the interaction term with the highest influence measure based on an F-Test, T-Test, or any other statistical inference technique. For example, suppose the p-value for the first user segment is 75.3%, for the second user segment is 30.7%, for the third user segment is 32.1%, and for the fourth user segment is 3.8%. In this example, the intent predictor module 135 can rank the interaction terms and determine that the fourth interaction term corresponding to the fourth user segment is the one with the highest influence measure. The intent predictor module 135 can also identify the interaction event associated with the fourth user segment and the interaction term as the one that lead to the conversion event.

The intent predictor module 135 can be configured to determine an intent index for the account identifier based on the post-conversion model. From a psychological perspective, the intent index can also represent the interest or intent expressed by the user associated with the account identifier with regards to product or service of the content provider 115 or the content provider 115 itself. From a human-computer interaction perspective, the intent index can represent the likelihood or probability of the end user computing device 125 associated with the account identifier interacting again with a content item associated with the content provider 115 or content publisher 120. The intent index can be a numerical measure, such as an integer or decimal, or an enumerated score. For example, the intent index can be a floating point between 0 and 1. The intent predictor module 135 can be configured to generate the intent index based on a statistical aggregation, weighted sum, or otherwise amalgamation of the one or more interaction terms of the post-conversion model. For example, at the sampling time, after having generated the post-conversion model, the intent predictor module 135 can calculate the intent index as a weighted sum of the intent indices of the assigned user segments for the account identifier.

The intent predictor module 135 can be configured to store, categorize, or otherwise classify the account identifier to an interest cluster based on the intent index. The intent predictor module 135 can be configured to store the account identifier into one or more clusters based on the interest index and the one or more thresholds of the respective interest cluster. Each intent cluster can indicate a level of interest as measured by the intent index. Each intent cluster can include a threshold or range of intent indices categorized under the respective intent cluster. For example, at the sampled time, an intent index between 0 and 0.1 can be categorized as a "low" interest cluster, between 0.1 to 0.7 can be categorized as a "medium" interest cluster, and between 0.7 to 1 can be categorized as "high" interest cluster.

The content item provider module 140 can be configured to determine a content item serving parameter based on the interest cluster. The content item provider module 140 can be configured to select a content item based on the intent index. The content item selected can be associated with the content provider 115 or content publisher 120, or any other entity associated with either the content provider 115 or the content publisher 120. The content item serving parameter can include a frequency, a time frame, and a size at which to provide the content item for display at the end user computing device 125. The content item serving parameter can specify one or more types of the content item to provide for display at the end user computing device 125. One or more types of the content item can include a text, static, animated, video, and audiovisual advertisement, among others. For example, suppose account identifier "r312a8K" has a computed intent index of 0.883 for bicycles made by the content provider 115 "JKL, Inc." and is categorized into the high interest cluster. Based on the categorized interest cluster, the content item provider module 140 can specify that an advertisement for JKL, Inc.'s bicycles be displayed at the end user computing device 125 of account identifier "r312a8K" once every 5 hours between 9:00 am to 7:00 pm on weekends as one of a full screen interstitial advertisement or large video advertisement. The content item provider module 140 can be configured to provide the content item for display at the end user computing device 125 according to the content item serving parameter.

Figure 2A:
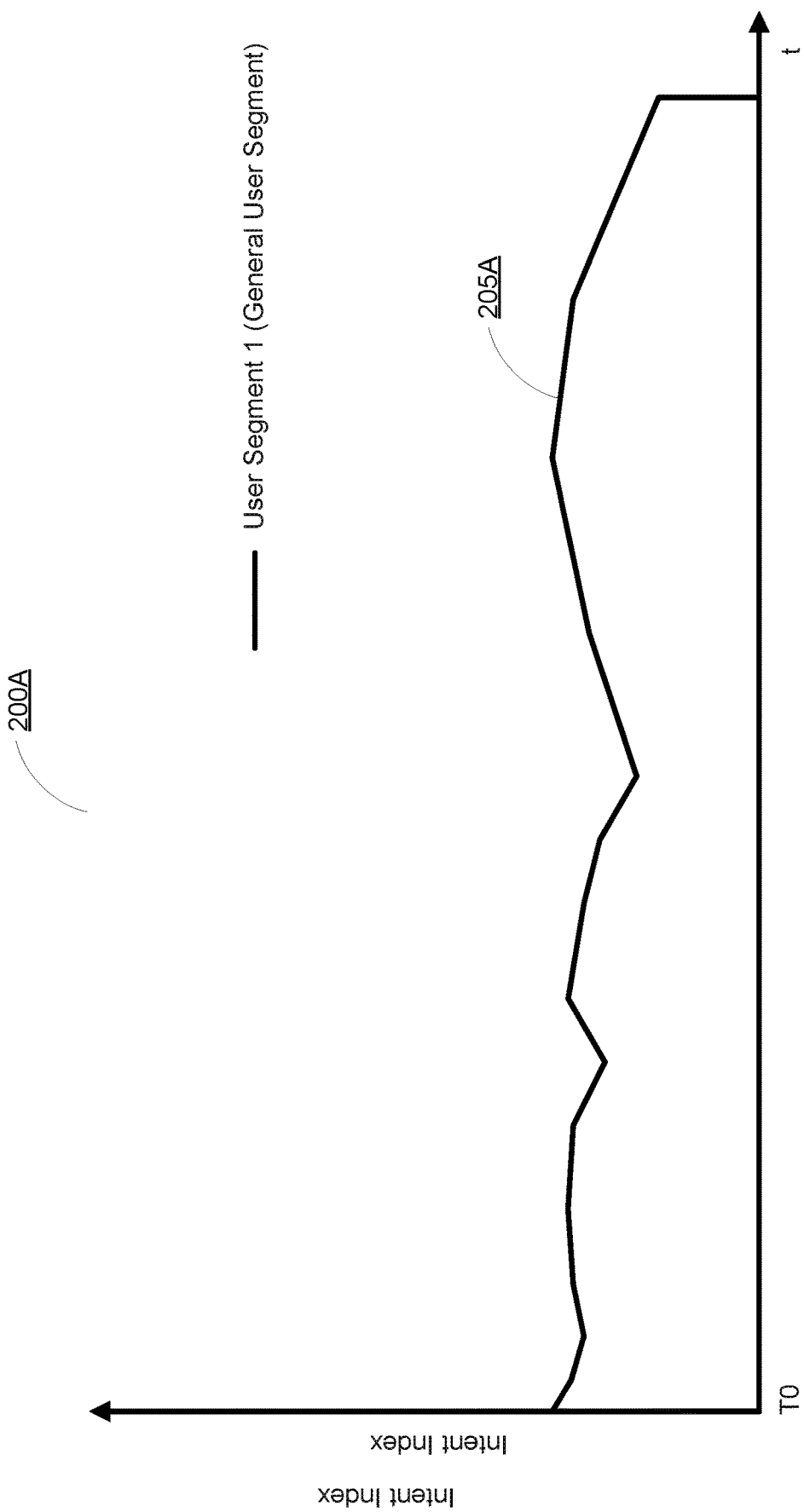
FIGS. 2A-2C are graphs depicting examples of intent index trajectories of user segments for an item, according to illustrative implementations.
Figure 2B:
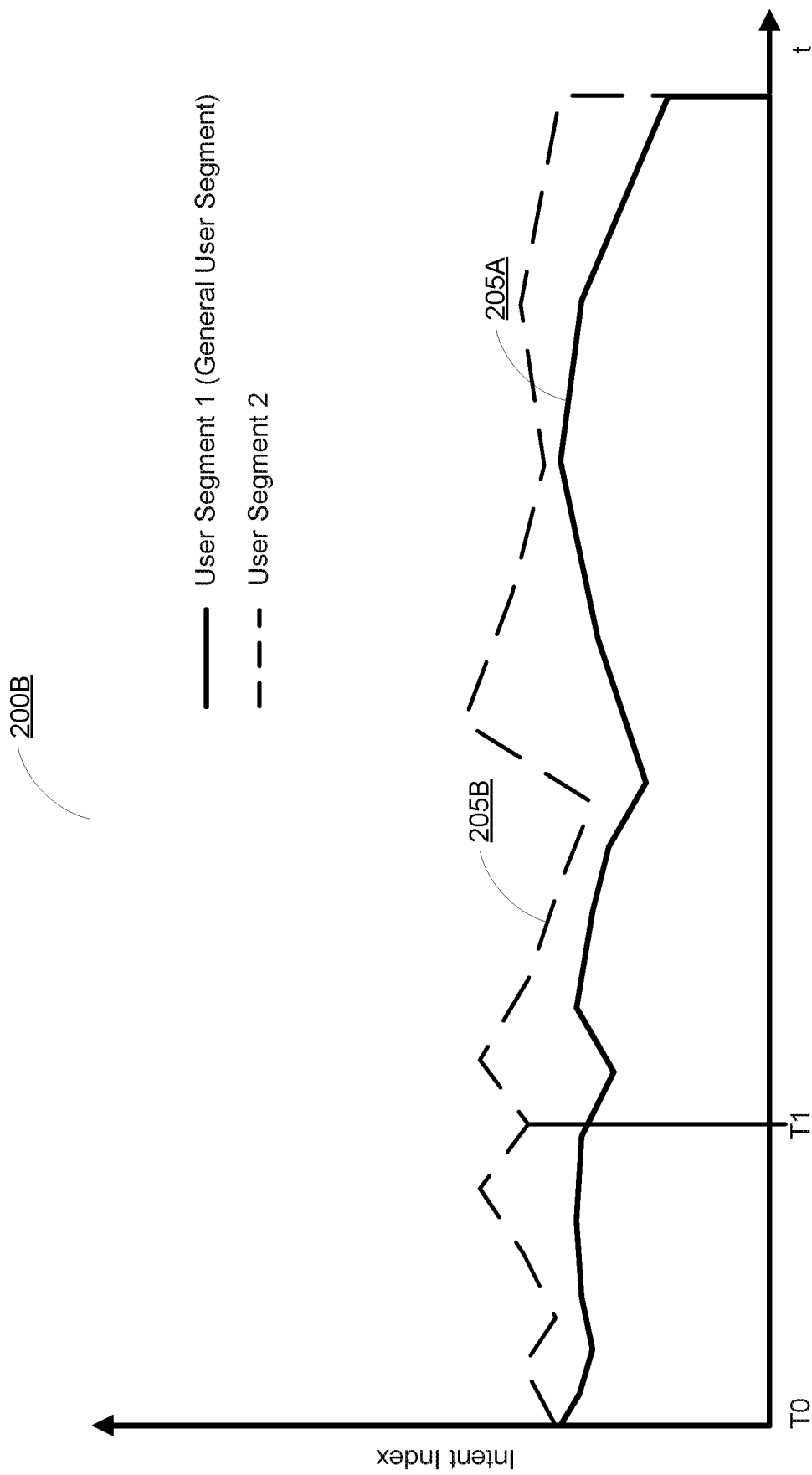
Figure 2C:
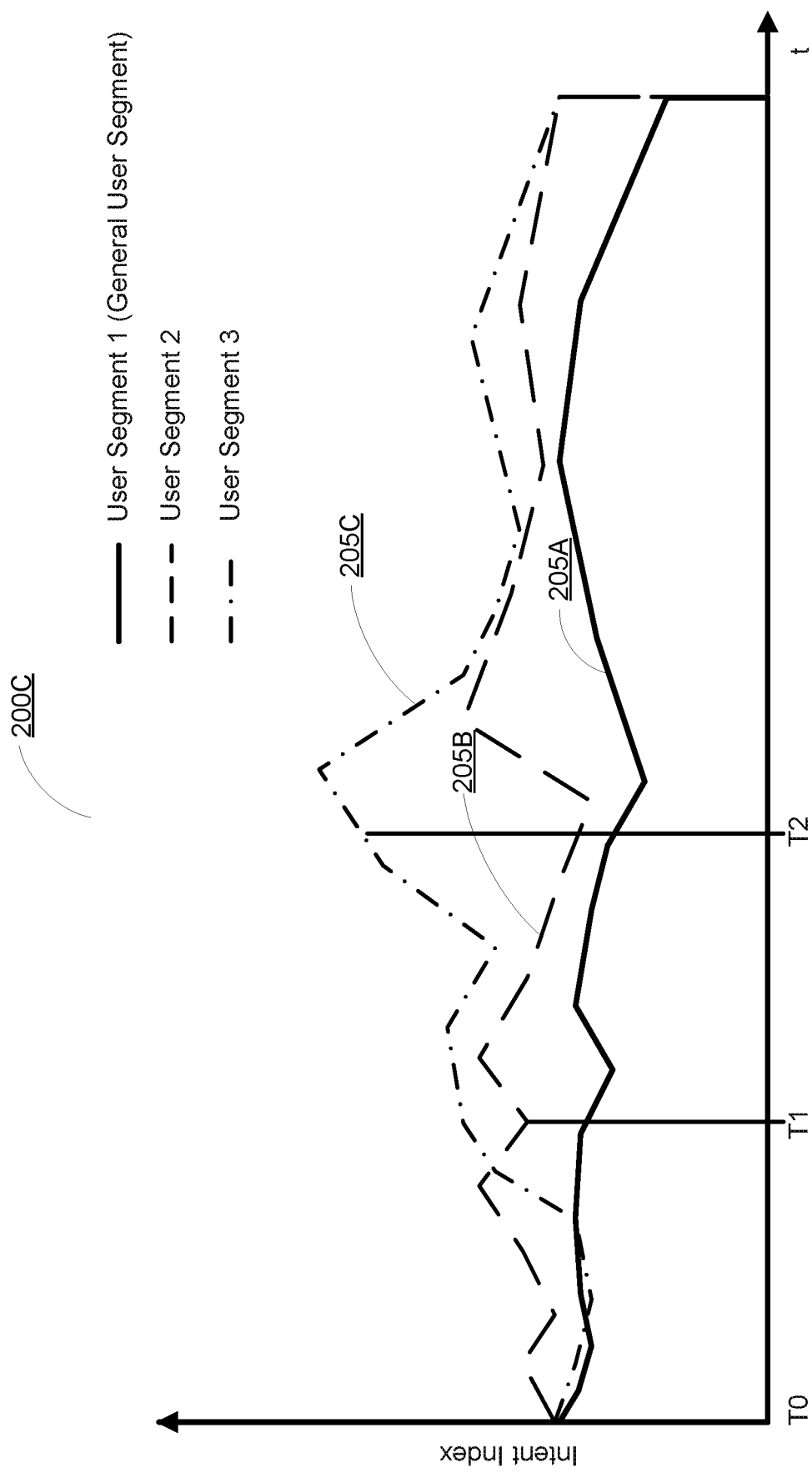

Referring to FIGS. 2A-2C, FIGS. 2A-2C show graphs 200A-C depicting examples of intent index trajectories of user segments for an item, according to illustrative implementations. In FIGS. 2A-2C, the vertical index is intent index and the horizontal index is time starting from $T_0$. The time $T_0$ may represent time at which, the first interaction by the end user computing device 125 associated with the account identifier was logged. The trajectories plotted are for various user segments. Trajectory 205A represents the intent index over time for user segment 1, or the general user segment. Trajectory 205B represents the intent index over time for user segment 2. Trajectory 205C represents the intent index over time for user segment 3. Over time, as the interaction cataloguer module 130 and the intent predictor module 135 acquires more information about the account identifier, intent index trajectories of granular, finer resolution can be measured, predicted, or otherwise determined. For the purposes of presentation, the trajectory indexes for 205A-205C have been plotted fully to time t.

Referring now to FIG. 2A, FIG. 2A depicts the intent index graph 200A depicting when the interaction cataloguer module 130 can first assign the account identifier to the first segment for the pre-conversion model at time $T_0$. At time $T_0$, the account identifier is assigned to the general user population, since the interaction cataloguer module 130 has no prior information about the account identifier. In addition, the intent predictor module 135 can have measure, predict, or otherwise determine the trajectory 205A over time t for the general user population. In this illustration, as trajectory 205A represents the intent index for products or services of the content provider 115 or the content provider 115 itself over the general user population, the trajectory 205A is generally flat throughout time t. The trajectory 205A may vary due to exogenous factors such as time of year that may affect the general user population.

Referring now to FIG. 2B, FIG. 2B represents when the interaction cataloguer module 130 can first assign the account identifier to the second segment for the pre-conversion model, responsive to receiving one or more interactions from the end user computing device 125 at time $T_1$. At time $T_1$, the interaction cataloguer module 130 has received a user interaction from the end user computing device 125 associated with the account identifier and the account identifier is assigned to the user segment 2. In addition, the intent predictor module 135 can measure, predict, or otherwise determine trajectory 205B over time t for user segment 2. In this illustration, since the interaction cataloguer module 130 and intent predictor module 135 has acquired more detailed, granular information about account identifier and user segment 2 compared to the general user population, trajectory 205B is generally more uneven and finer detailed. Moreover, since user segment 2 may have more of interest than the general user segment, as indicated by more interactions by user segment 2 with content items or webpages associated with the content provider 115, the intent index trajectory 205B is higher than trajectory 205A.

Referring now to FIG. 2C, FIG. 2C represents when the interaction cataloguer module 130 can first assign the account identifier to the third segment, responsive to receiving a third interaction that is a conversion event from the end user computing device 125 at time $T_2$. At time $T_2$, the account identifier is also assigned to user segment 3. User segment 3 can include user segments or populations have converted. The conversion event may be defined by the content provider 115 or determined by the intent predictor module 135 based on statistical inference techniques. Furthermore, at time $T_2$, the intent predictor module 135 can measure, predict, or otherwise determine trajectory 205C over time t for user segment 3. In this illustration, since the interaction cataloguer module 130 and the intent predictor module 135 has acquired more detailed, granular information about account identifier and user segment 3 compared to the user segment 2 and the general user population, trajectory 205C is generally even more uneven and finer detailed. Moreover, since user segment 3 may have more of interest than user segment 2 or the general user segment, as indicated by more interactions by user segment 3 with content items or webpages associated with the content provider, the intent index trajectory 205C is higher than trajectory 205A and 205B. Using the trajectory 205C, the content item provider module 140 can determine content item serving parameters. For example, the content item provider module 140 can specify that a higher frequency of providing the content item for display at the end user computing device 125 around the time the trajectory 205C reaches peak value after $T_2$ and adjust accordingly after the peak.

The intent predictor module 135 can be configured to identify or otherwise find a second item. The second item may or may not be associated or otherwise provided by the same content provider 115 that provided first item, as the second item may be provided by a content provider 115 different from that of the first item. The intent predictor module 135 can be configured to access a predefined taxonomy list or a interrelated item area graph stored at the database 145. For example, the predefined taxonomy list can specify that the item "handbags" may be related to the item "sports shoes." The intent predictor module 135 can be configured to generate the interrelated item area graph based on collaborative filtering of one or more items and time of the one or more interactions for each item. The interrelated item area graph can represent the chronological co-occurrence of conversion events. The interrelated item area graph can, track conversion events on the one or more items made within a predefined timeframe. For example, the interrelated item area graph can track the relationship among the purchases for related items, such as handbags and shoes, that occur within a day. The intent predictor module 135 can be configured to identify or otherwise select the second item based on the conversion event. The intent predictor module 135 can identify the second item based on a webpage of the content provider 115 or content publisher 120. For example, the intent predictor module 135 can select the second item by applying natural language processing algorithm such as semantic analysis, information extraction, keyword extraction, and automated summarization, among others on the landing page of the advertisement.

The intent predictor module 135 can be configured to determine an intent index for the second item for the account identifier based on the post-conversion model. The post-conversion model may have been generated for the first item. The intent predictor module 135 can be configured to determine the intent index for the second item for each of the segments associated with the account identifier. The intent predictor module 135 can be configured to determine the statistical influence for one or more interaction terms for the intent index for the second item. The intent predictor module 135 can be configured to generate the intent index based on a statistical aggregation, weighted sum, or otherwise a function of the one or more interaction terms of the post-conversion model for the second item. For example, suppose the user has converted by purchasing an airplane ticket to a popular holiday destination, the first item for the content provider 115. Further suppose that the account identifier for the user has been assigned to the general user segment, the user segment that visited the webpage of the tourism board of the destination, and the user segment that made a purchase order for the airplane ticket on the webpage of the content provider 115. In this example, if the second item were a local museum in the popular holiday destination, the intent predictor module 135 can determine the intent indices for the local museum for each of the user segments that the account identifier has been assigned to using machine learning algorithms. The intent predictor module 135 can then determine the determine intent index for the account identifier by aggregating or amalgamating the intent indices for the local museum. The intent predictor module 135 can generate the intent index for the second item for the account identifier even before conversion based on the post-conversion model generated for the first item.

The intent predictor module 135 can be configured to select the second item based on the intent indices for one or more items. The intent predictor module 135 can be configured to determine the intent indices for each of the one or more items. The intent predictor module 135 can be configured to determine the intent index for the respective item based on the post-conversion model for the respective item. The intent predictor module 135 can be configured to rank the one or more items based on the respective intent index. The intent predictor module 135 can be configured to select the item with the highest intent index as the second item.

The content item provider module 140 can be configured to select a content item accessed from a content item database based on the second item. The content item can be associated with the second item. The content item database can include database 145 or a database associated with the content provider 115 or content publisher 120. The content item database accessed for the second item can include a database different from the one accessed for the first item. The content item provider module 140 can be configured to identify a second content provider 115 based on one or more user segments, such as the first user segments, the second user segment, and the third user segment. The second content provider 115 can be different from the first content provider 115. The second content provider 115 may share the same or similar user segments as the first content provider 115.

The interaction cataloguer module 130 can be configured to assign the account identifier to a fourth segment for the pre-conversion model, responsive to receiving a fourth interaction from the end user computing device 125. The interaction cataloguer module 130 can be configured to generate the post-conversion based on the fourth interaction. The fourth segment can include a subset of the first segment. Subsequent to determining the intent index for the second item, the intent predictor module 135 can be configured to determine that the intent index for a third item of the one or more items may be greater than the intent index for the second item based on the post-conversion model. The intent predictor module 135 can be configured to determine that the intent index for the third item may be greater than the intent index for the second item by a predefined threshold. The content item provider module 140 can be configured to select another content item associated with the third item, responsive to determining that the intent index for the third item is greater than the intent index for the second item. For example, suppose the second item originally selected by the intent predictor module 135 was a lawnmower advertised by the content, provider 115. Further suppose that the interactions received by the interaction cataloguer module 130 thereafter were with websites for waterskies and using the updated post-conversion model, the intent predictor module 135 has determined that the intent index for waterskies is greater than the intent index for lawnmowers. In this example, the content item provider module 140 can select content items for waterskies to provide for display at the end user computing device 125.

Figure 3:
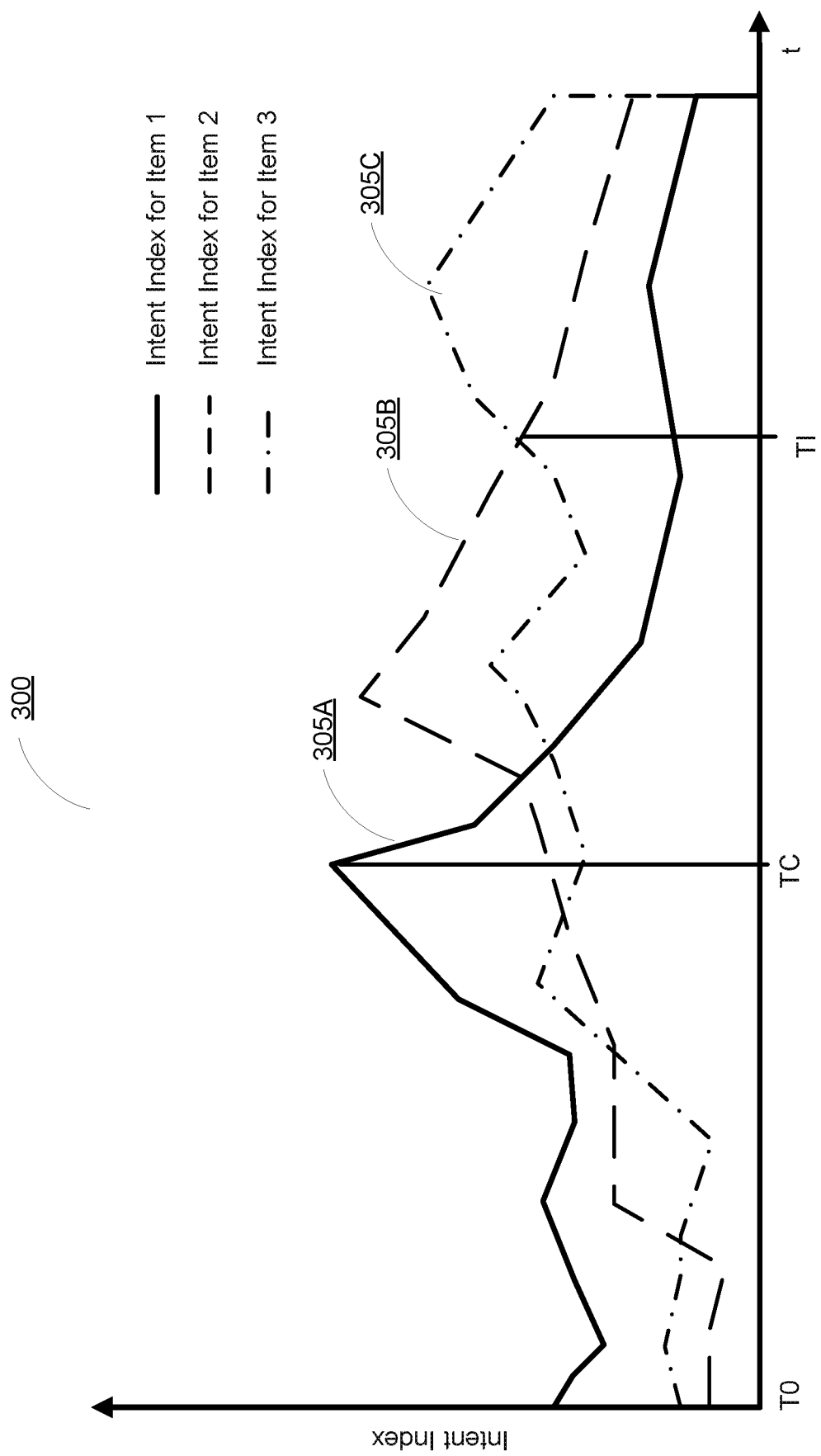
FIG. 3 is a graph depicting an example of intent index trajectories of a user segment for items, according to an illustrative implementation.

Referring to FIG. 3, FIG. 3 shows a graph depicting an example of intent index trajectories of items, according to an illustrative implementation. In FIG. 3, the vertical index is intent index and the horizontal index is time starting, from $T_0$. Time $T_0$ represents time at which the first interaction by the end user computing device 125 associated with the account identifier was logged. Time $T_C$ represents the time at which the conversion event by the end user computing device 125 associated with the account identifier was logged or occurred. The trajectories plotted are for various items. Trajectory 305A represents the intent index over time for item 1, or the general user segment. Trajectory 305B represents the intent index over time for item 2. Trajectory 305 represents the intent index over time for item 3. In this example, the intent predictor module 135 may have already calculated the intent index trajectories 305A-305C. The intent predictor module 135 can then select the item 2 as trajectory 305B at time of conversion, $T_C$. The content item provider 140 can select and provide for display at the end user computing device 125 an advertisement for item 2. After some time $T_I$, the interaction cataloguer module 130 can receive more interactions from the end user computing device 125 associated with the account identifier, and the intent predictor module 135 can determine that the intent index for item 3 may be greater than the intent index item 2 based on the newly received intent indices. As seen in FIG. 3, the intent index trajectories for item 2 305B may decrease and be over taken by the intent index trajectory for item 3 305C. At this time, the content item provider module 140 can select and provide for display at the end user computing device 125 advertisements for item 3.

In addition, data processing system 110 can be configured to provide an advertisement campaign management user interface for display for the content provider 115, content publisher 120, or the end user computing device 125. Using the advertisement campaign management user interface, the content provider 115 (e.g., advertiser) can adjust the advertisement campaign in accordance with the average intent index for particular user segments or products or services advertised by the content provider 115. The advertisement campaign management interface can be stored at the database 145. An example of an advertisement campaign management interface can be seen in FIGS. 4A-4G.

Figure 4A:
FIGS. 4A-4G are displays depicting an advertisement campaign manager interfaces including graphs of intent index trajectories, according to illustrative implementations.
Figure 4B:
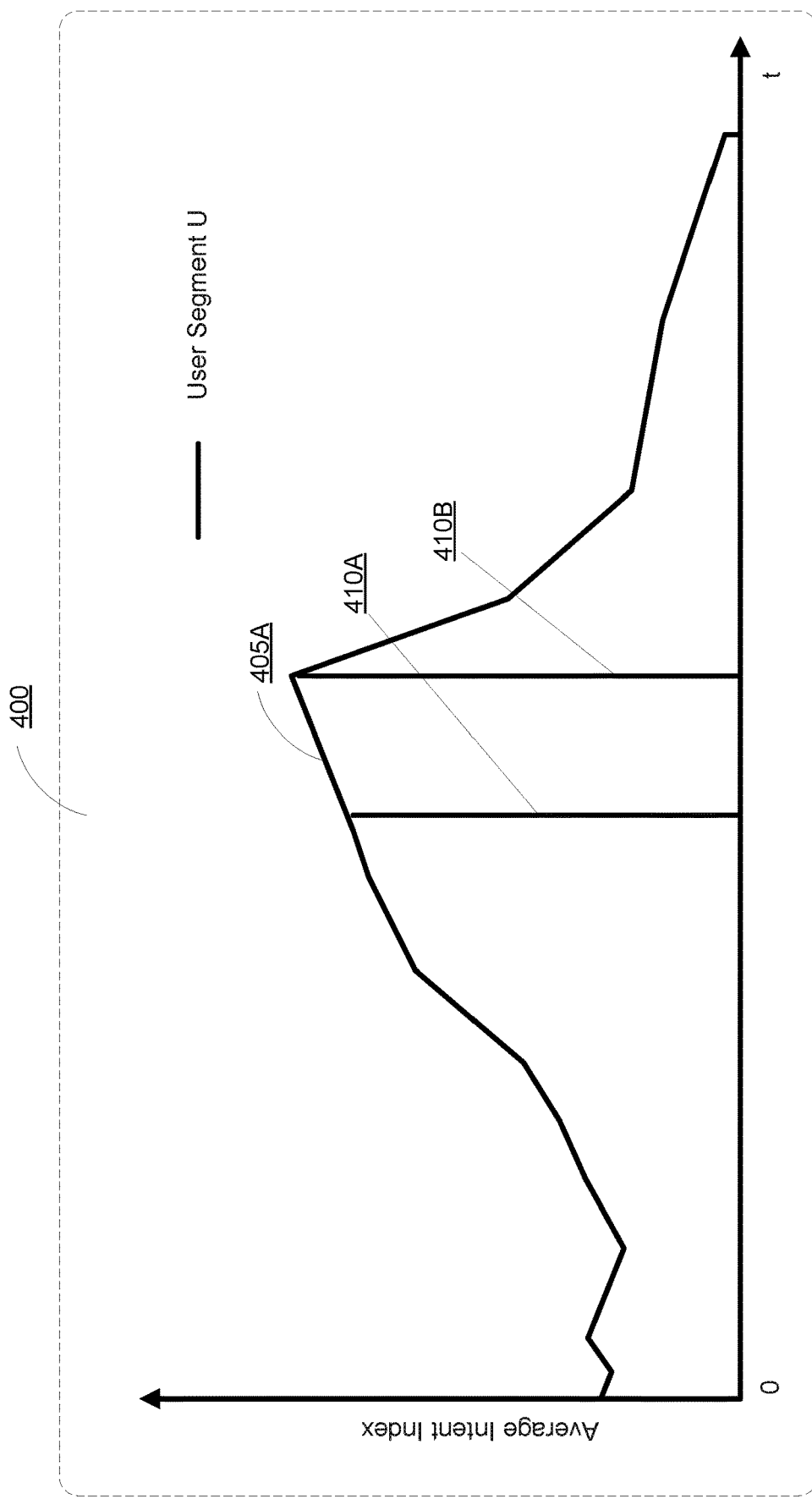
Figure 4C:
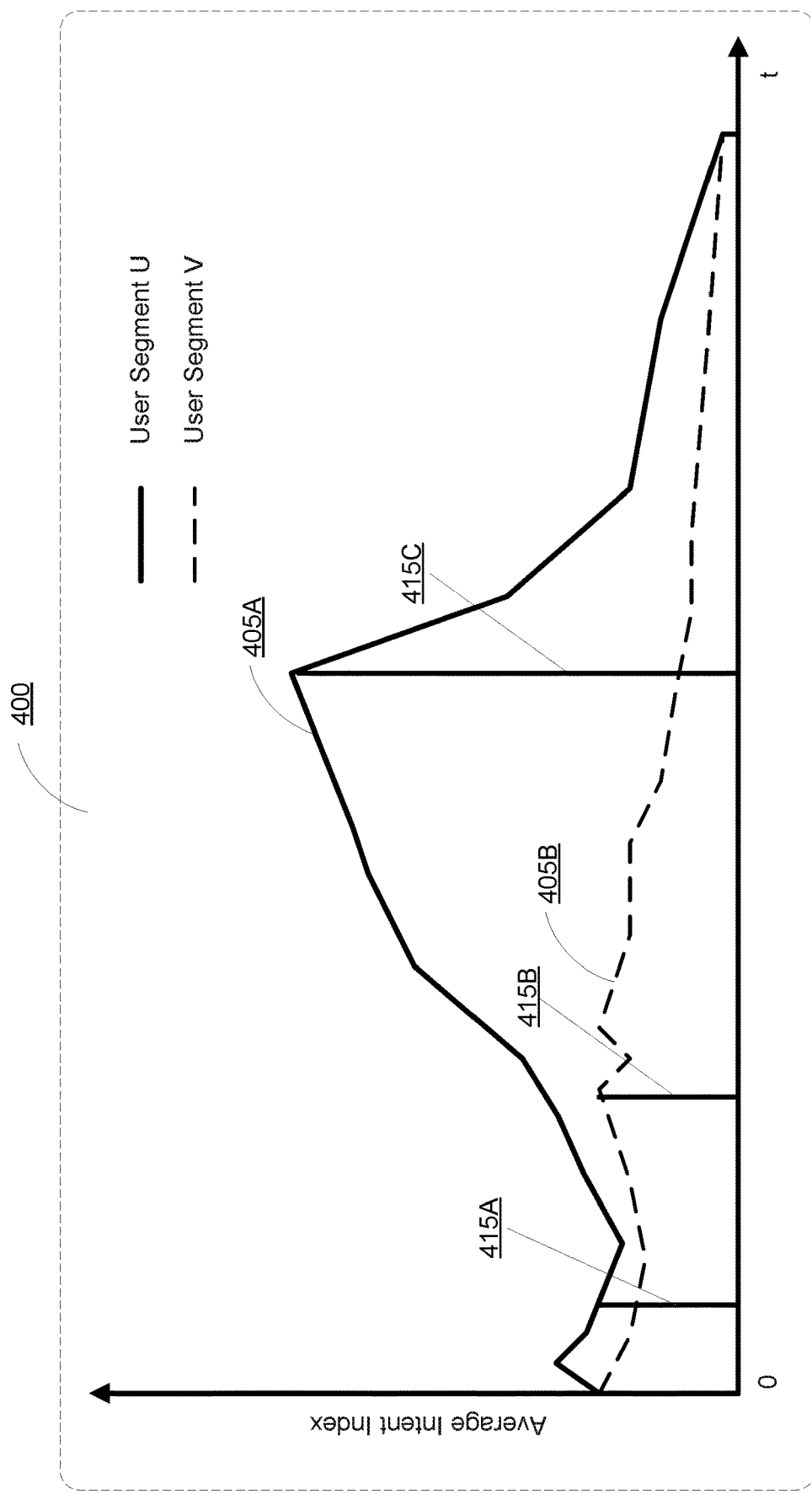

Referring to FIGS. 4A-4G, FIGS. 4A-4G show displays depicting an advertisement campaign manager interface 400 including graphs of intent index trajectories, according to illustrative implementations. The campaign management interface 400 can display to the content provider 115 the average intent index trajectories for various user segments, thereby, for example, allowing the content provider 115 to specify the onset and offset times of the remarketing campaign. Using the campaign management interface 400, the content provider 115 can examine or analyze the intent index trajectories for a selected user segment. In FIG. 4A, depicted is the campaign management interface 400 with the predicted average intent index trajectory 405A for user segment U. Using the average intent index trajectories, the campaign management interface 400 can allow the content provider 115 to define the onset and offset of the remarketing campaign. In FIG. 4B, depicted is the campaign management interface 400 with the onset 410A and offset 410B set on the predicted average intent trajectory 405A by the content provider 115 for the remarketing campaign for user segment U. The content provider 115 can also set or otherwise define the onsets and offsets of the remarketing campaign for particular user segments or subsets of user segments. In FIG. 4C, depicted is the campaign management interface 400 with predicted average intent trajectories 405A and 405B for user segments U and V respectively, together with the onsets and offsets 415A-415C for user segments U and V. In this example, using the campaign management interface 400, the content provider 115 can set the onset of the remarketing campaign for user segments U and V at 415A. The content provider 115 can set different offsets for the remarketing campaign at 415B and 415C for user segments U and V respectively.

Figure 4D:
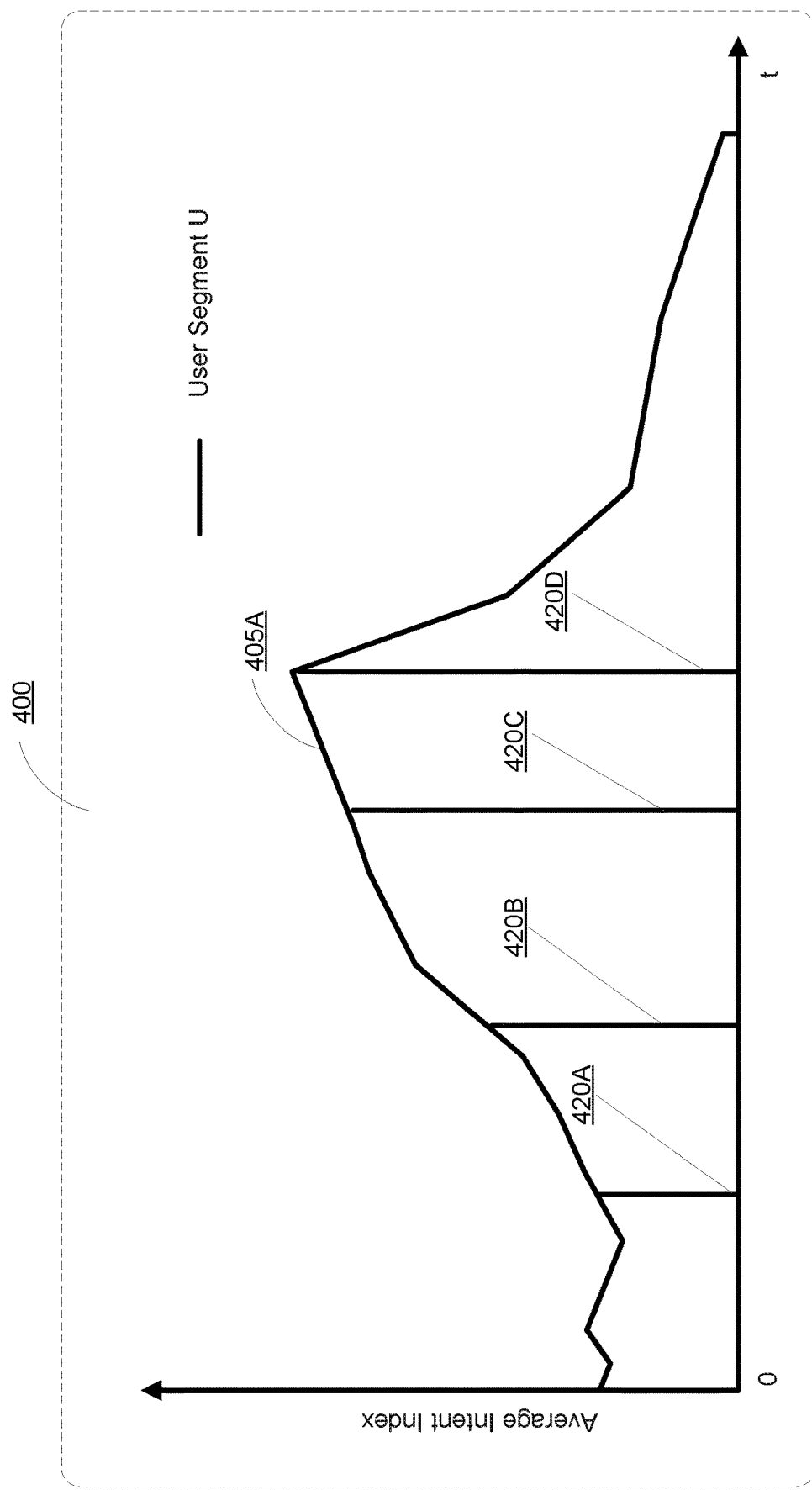
Figure 4E:
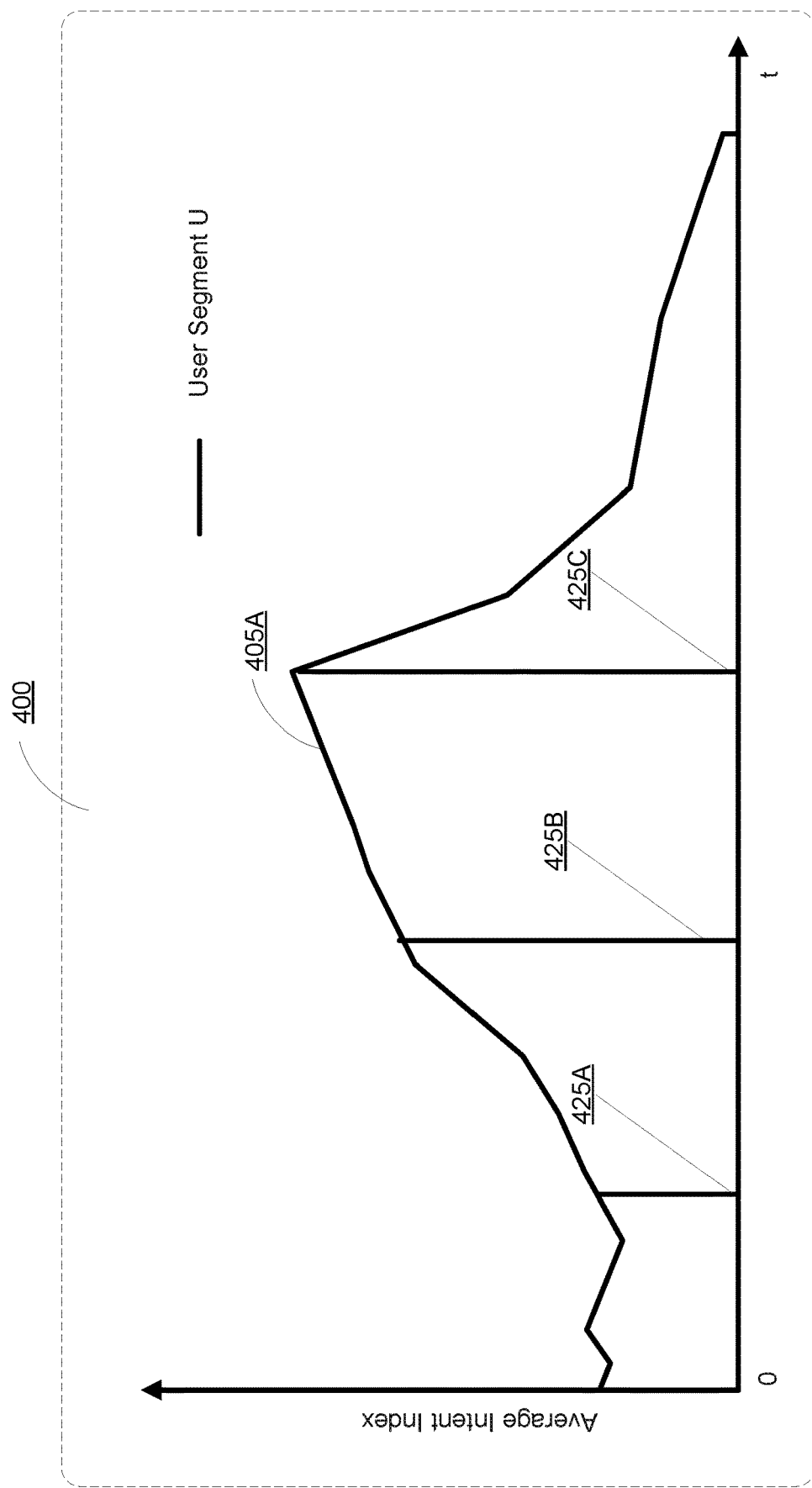

The campaign management interface 400 can also allow the content provider 115 to set the content item serving parameters. Using the campaign management interface, the content provider 115 can specify the content item serving parameters over time. In FIG. 4D, depicted is the campaign management interface 400 with the predicted average intent trajectory 405A for user segment U together with the onsets and offsets 420A-420D for different, specified content item serving parameters. In this example, the content provider 115 can specify that between 420A and 420B that the frequency of providing or showing and advertisement at the end user computing device 125 be 3 times a week, between 420B and 420C be 5 times a week, and between 420C and 420D be 7 times a week. In FIG. 4E, depicted is the campaign management interface 400 with the predicted average intent trajectory 405A for user segment U together with the specified onsets and offsets 425A-425C for different, specified content item serving parameters. In this example, the content provider 115 can specify that one creative (e.g., a banner online ad) be provided or shown to the end user computing device 125 between 425A and 425B and another creative between 425B and 425C.

Figure 4F:
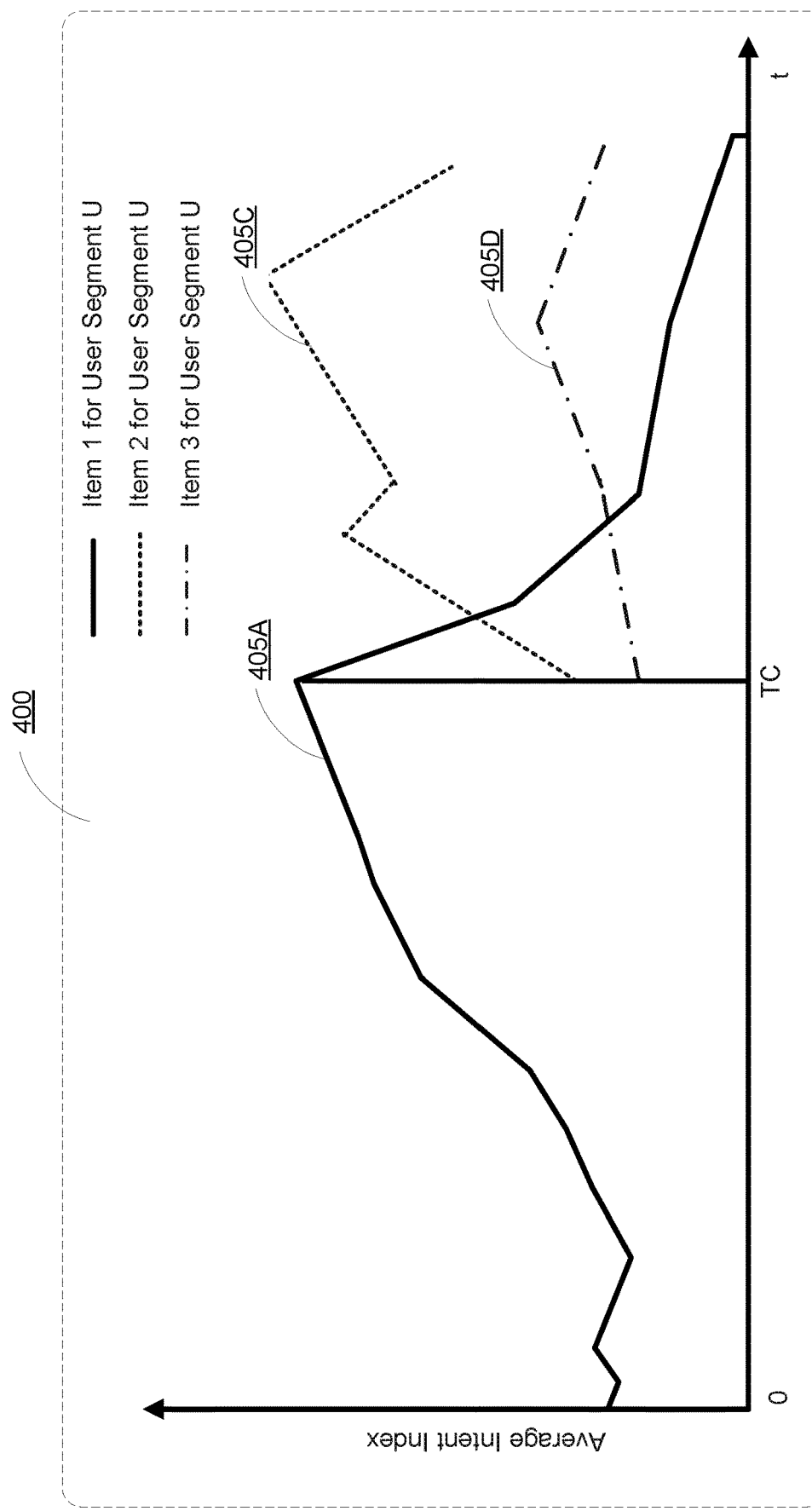
Figure 4G:
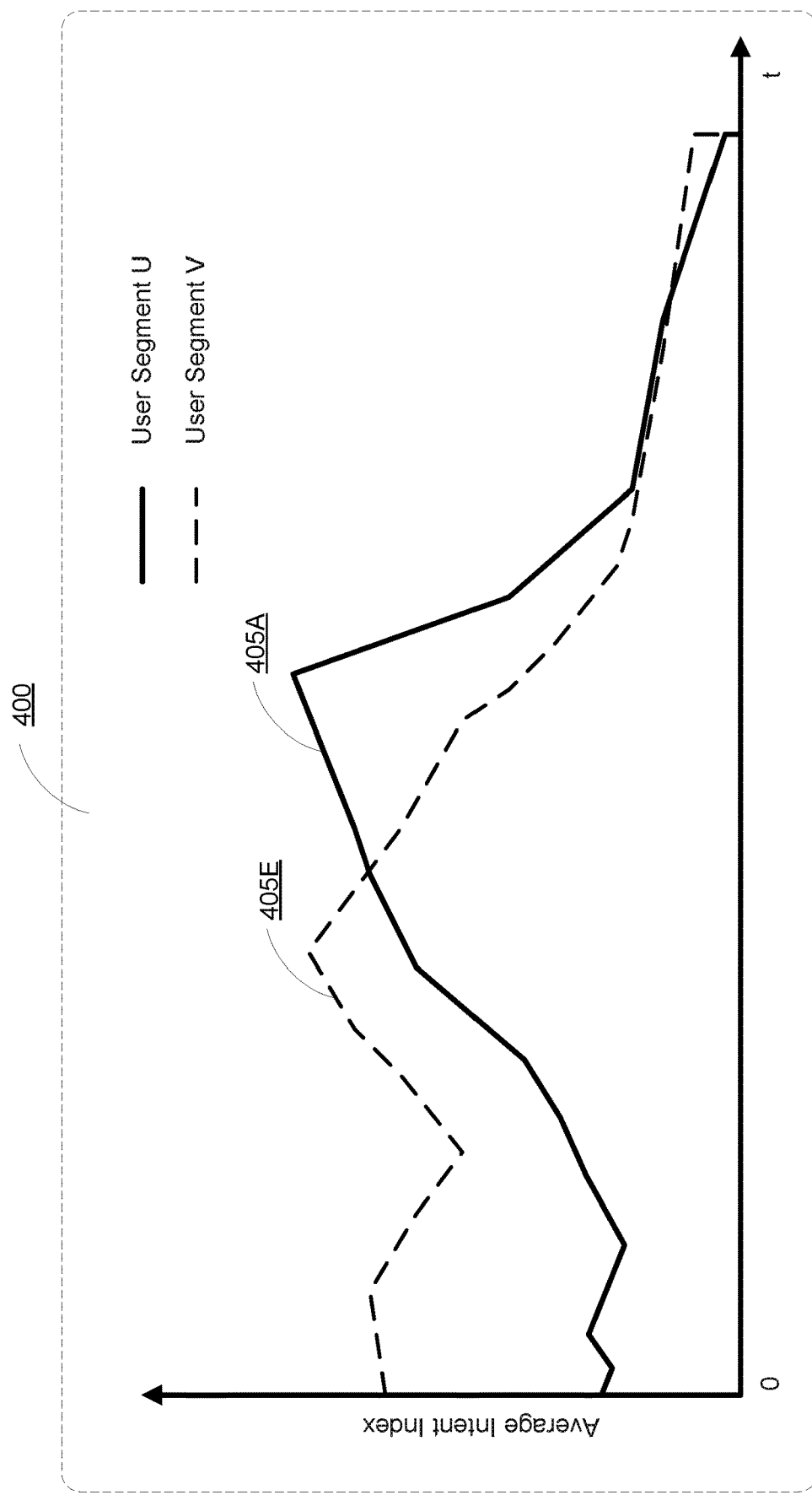

The campaign management interface 400 can also allow the content provider 115 to compare the intent index trajectories of various items and various user segments. Using the campaign management interface 400, the content provider 115 can track, analyze, or otherwise compare the average intent index trajectories. In FIG. 4F, depicted is the campaign management interface 400 with the average intent index trajectories 405A, 405C, and 405D for user segment U for items 1-3. Items 2 and 3 may be those identified by the intent predictor module 135 as being related to item 1 based on the predefined taxonomy list or the interrelated item area graph. In this example, the campaign management interface 400 can display the average intent index trajectory 405C for item 2 is greater than the average intent index trajectory 405D for item 3 for all times subsequent to time of conversion, $T_C$. Using the campaign management interface 400, the content provider 115 can also compare the intent index trajectories for various user segments. In FIG. 4G, depicted is the campaign management interface 400 with the average intent index trajectory 405A for user segment U and average intent index trajectory 405E for user segment. The intent predictor module 135 can be configured to identify various user segments based on recognition algorithms, such as principal component analysis, k-nearest neighbor algorithm, and independent component analysis among others. The content provider 115 can analyze the two average intent index trajectories 405A and 405E.

Figure 5:
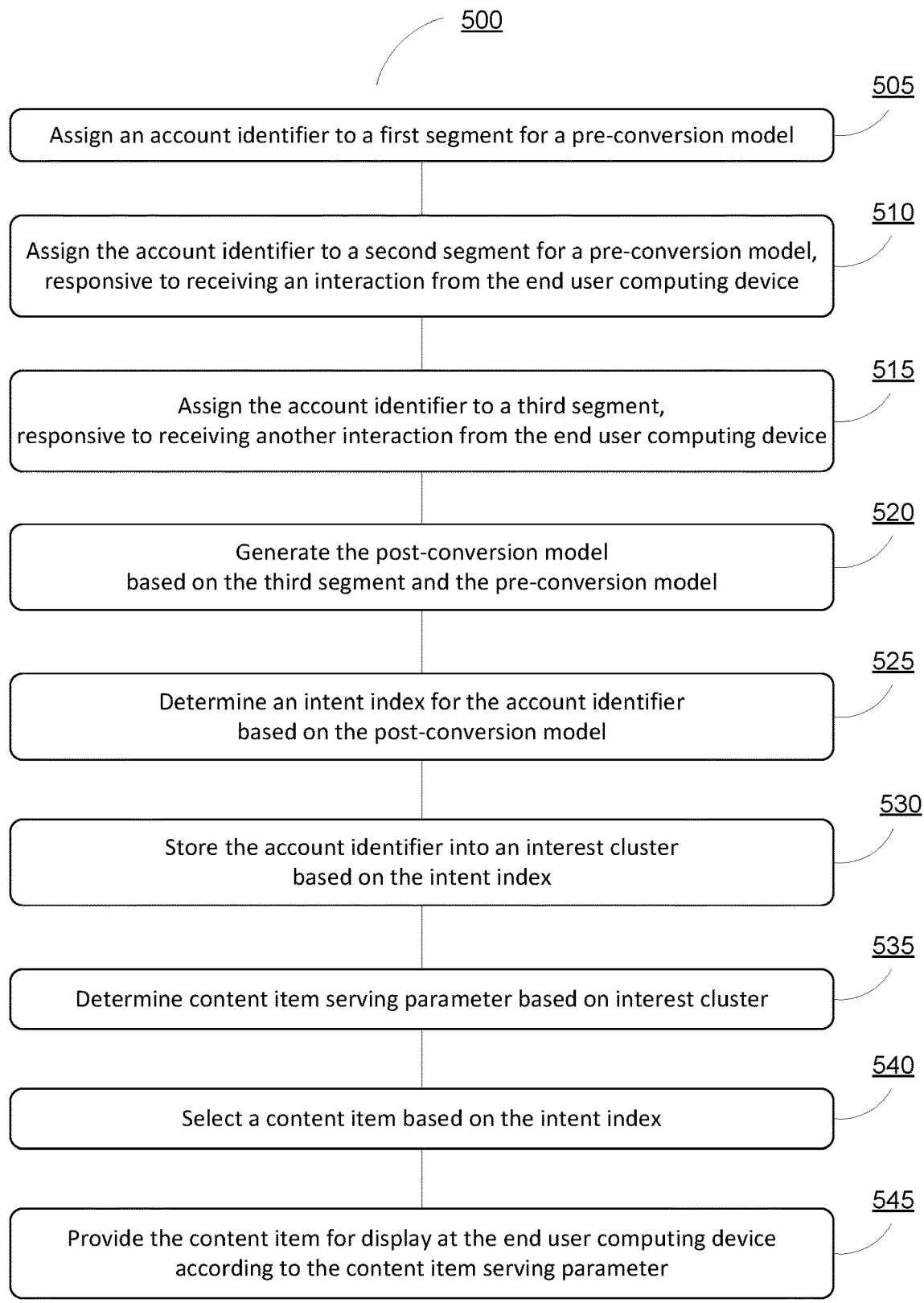
FIG. 5 is a flow diagram depicting a method of varying the intensity of providing content items in a remarketing campaign based on, tracking client device interactions, according to an illustrative implementation.

Referring to FIG. 5, FIG. 5 is a flow diagram or method 500 depicting a method of varying the intensity of providing content items in a remarketing campaign based on tracking client device interactions, according to an illustrative implementation. The functionality described herein with respect to method 500 can be performed or otherwise executed by the data processing system 110 or the various modules of the data processing system 110 shown in FIG. 1.

The data processing system can assign an account identifier to a first segment for a pre-conversion model (ACT 505). The data processing system can assign the account identifier to the first segment, for the pre-conversion model, responsive to receiving a first interaction from the client device. An account identifier can include any identifier used to identify a user. For example, the account identifier can include an email, account number, or randomly generated numerical identifier. The account identifier can be associated with one or more end user computing devices. The first interaction can be associated to a content provider. For example, the first interaction can include an impression of an advertisement created by the content provider shown on a webpage hosted by the content publisher. The first segment can include the general user segment. The general user segment can be stored and accessed from the database. For example, the general user segment may be over all users that have had an interaction with the content provider.

The data processing system can assign the account identifier to a second segment for the pre-conversion model, responsive to receiving a second interaction from the client device (ACT 510). The second segment can include a subset of the first segment. The data processing system can be configured to determine that the second interaction is one of a plurality of interactions. The plurality of interactions can be specified, predetermined, or otherwise predefined by the content provider. The data processing system can be configured to assign the account identifier to the second segment for the pre-conversion model, responsive to determining that the second interaction is one of the plurality of interactions. The plurality of interactions can include, for example, mouse-hover over a content item associated with the content provider, muting an audio or audiovisual content item associated with the content provider, visits or revisits of a webpage or website of the content provider or content publisher, visits or revisits of a webpage or website containing information about the content provider, use of search queries containing terms associated with the content provider, writing reviews about the content provider on webpages or websites such as social networking websites, making purchase orders online or offline for products or services associated with the content provider, and visits of a physical store location associated with the content provider, among others. The second segment can define a subset user segment that may be associated with a particular location identifier, interaction type, device type of, or applications used on the, among others. For example, the second segment may define the user segment associated with location identifiers with the zip code 90210 and associated with tablets as the device type of the end user computing devices.

The data processing system can receive account data. The account data can include location identifier of the associated with the account identifier, information inputted by the user associated with the account identifier, and device type or specifications of the, among others. The data processing system can assign the account identifier to the second segment for the pre-conversion model, responsive to receiving the account data associated with the account identifier. The data processing system can select the second segment from one or more segments for the pre-conversion model based on the account data, responsive to receiving the account data associated with the account identifier. The data processing system can assign the account identifier to the second segment for the pre-conversion model, responsive to the selection from the one or more segments for the pre-conversion model.

The data processing system can assign the account identifier to a third segment, responsive to receiving a third interaction from the end user computing device (ACT 515). The third interaction can include a conversion event associated with the content provider. The third segment can be indicative of the conversion event. The third segment can also include a subset of the first segment or the second segment. The data processing system can determine that the third interaction is a conversion event. The data processing system can access a list of predefined conversion events from the database. The list of predefined conversion events can be defined by the content provider or content publisher. The list of predefined conversion events can include placement of an order for a product or service associated with the content provider or content publisher, and visit of the physical store location associated with the content provider or content publisher, among others. The list of predefined conversion events can also include a plurality of interactions, including for example, mouse-hover over a content item associated with the content provider, muting an audio or audiovisual content item associated with the content provider, visits or revisits of a webpage or website of the content provider or content publisher, visits or revisits of a webpage or website containing information about the content provider, use of search queries containing, terms associated with the content provider, writing reviews about the content provider on webpages or websites such as social networking websites, making purchase orders online or offline for products or services associated with the content provider, and visits of a physical store location associated with the content provider, among others. The third segment can define a subset user segment that may be associated with a particular location identifier, interaction type, device type of, or applications used on the, among others. For example, the third segment may define the user segment and associated with location identifiers with the State of California associated with smartphones as the device type of the end user computing devices that have converted. The list of predefined conversion events can also include interactions determined to have a statistically significant influence on the intent index. The data processing system can determine that the third interaction is a conversion event based on the list of predefined conversion events.

The data processing system can generate a post-conversion model based on the third segment and the pre-conversion model (ACT 520). The data processing system can segment, divide, partition, or otherwise limit a first segment subset and a second segment subset. The first segment subset and the second segment subset each can include the subset of the first segment that converted and the subset of the second segment that converted respectively. The first segment subset and the second segment subset each can include the subset of the first segment that have done the same interaction as the third interaction and the subset of the second segment that have done the same interaction as the third interaction respectively. The data processing system can determine, measure, estimate or otherwise calculate a first influence measure for the subset of the first segment that converted and a second influence measure for the subset of the second segment that converted.

The data processing system can maintain the pre-conversion model. The pre-conversion model can include one or more interaction terms. Each of the interaction terms can correspond with a respective segment. Each of the interaction terms can include an intent index associated with the particular segment. The pre-conversion model can be implemented using, for example, an artificial neural network. This artificial neural network can include a plurality of input nodes, a plurality of Bidden nodes, and a plurality of output nodes. Each input node can correspond to a different user segment and each can have the input of intent index fed back for the respective segment and exogenous factors. Exogenous factors can include, for example, time of day, day of week, holidays, changes in weather patterns, and stock prices, among others. Each output node can correspond to different user segment and output the intent index for the corresponding user segment. The weights for the connections between the nodes can be predefined or adaptively or iteratively tuned based on error propagation. Using the interaction terms, the pre-conversion model can also be implemented using, for example, linear regression, analysis of variance (ANOVA), Bayesian learning, deep learning, and other statistical machine learning techniques.

The data processing system can generate a post-conversion model based on the third segment and the pre-conversion model. The data processing system can segment, divide, partition, or otherwise limit a first segment subset and a second segment subset. The first segment subset and the second segment subset each can include the subset of the first segment that converted and the subset of the second segment that converted respectively. The first segment subset and the second segment subset each can include the subset of the first segment that have done the same interaction as the third interaction and the subset of the second segment that have done the same interaction as the third interaction respectively. The data processing system can determine, measure, estimate or otherwise calculate a first influence measure for the subset of the first segment that converted and a second influence measure for the subset of the second segment that converted.

The data processing system can determine a third interaction term, responsive to assigning the account identifier to the third segment. The data processing system can generate the post-conversion model based on the one or more interaction terms. The data processing system can generate the post-conversion model based a function of the one or more interaction terms. The data processing system can determine or otherwise generate the post-conversion model, responsive to receiving a fourth interaction from the or responsive to assigning the account identifier to a fourth segment. For example, suppose there are two user segments corresponding to two interactions by the end user computing devices associated with the account identifier prior to the conversion event. In this example, the data processing system can determine the statistical influence measures of each of the interaction terms to the intent index. The data processing system can also wait until more interactions from the are received to gather more information about the account identifier in order to calculate higher order interaction terms between the two user segments. The data processing system can then determine or generate the post-conversion model based on determining the statistical influence measures of each of the interaction terms to the intent index.

The data processing system can determine or attribute which one of the previous interactions lead to the conversion event based on the post conversion model. The data processing system can rank the one or more interaction terms of the post-conversion model. The data processing system can determine, select, or otherwise identify the interaction event associated with the interaction term with the highest influence measure as the interaction event that lead to the conversion event. The data processing system can determine the interaction term with the highest influence measure based on an F-Test, T-Test, or any other statistical inference technique. For example, suppose the p-value for the first user segment is 75.3%, for the second user segment is 30.7%, for the third user segment is 32.1%, and for the fourth user segment is 3.8%. In this example, the data processing system can rank the interaction terms and determine that the fourth interaction term corresponding to the fourth user segment is the one with the highest influence measure. The data processing system can also identify the interaction event associated with the fourth user segment and the interaction term as the one that lead to the conversion event.

The data processing system can determine an intent index for the account identifier based on the post-conversion model (ACT 525). From a psychological perspective, the intent index can also represent the interest or intent expressed by the user associated with the account identifier with regards to product or service of the content provider or the content provider itself. From a human-computer interaction perspective, the intent index can represent the likelihood or probability of the associated with the account identifier interacting again with a content item associated with the content provider or content publisher. The intent index can be a numerical measure, such as an integer or decimal, or an enumerated score. For example, the intent index can be a floating point between 0 and 1. The data processing system can generate the intent index based on a statistical aggregation, weighted sum, or otherwise amalgamation of the one or more interaction terms of the post-conversion model. For example, at the sampling time, after having generated the post-conversion model, the data processing system can calculate the intent index as a weighted sum of the intent indices of the assigned user segments for the account identifier.

The data processing system can store, categorize, or otherwise classify the account identifier to an interest cluster based on the intent index (ACT 530). The data processing system can store the account identifier into one or more clusters based on the interest index and the one or more thresholds of the respective interest cluster. Each intent cluster can indicate a level of interest as measured by the intent index. Each intent cluster can include a threshold or range of intent indices categorized under the respective intent cluster. For example, at the sampled time, an intent index between 0 and 0.1 can be categorized as a "low" interest cluster, between 0.1 to 0.7 can be categorized as a "medium" interest cluster, and between 0.7 to 1 can be categorized as "high" interest cluster.

The data processing system can determine a content item serving parameter based on the interest cluster (ACT 535). The content item serving parameter can include a frequency, a time frame, and a size at which to provide the content item for display at the. The content item serving parameter can specify one or more types of the content item to provide for display at the. One or more types of the content item can include a text, static, animated, video, and audiovisual advertisement, among others. For example, suppose account identifier "r312a8K" has a computed intent index of 0.883 for bicycles made by the content provider "JKL, Inc." and is categorized into the high interest cluster. Based on the categorized interest cluster, the data processing system can specify that the advertisement for JKL, Inc.'s bicycles be displayed at the of account identifier "r312a8K" once every 5 hours between 9:00 am to 7:00 pm on weekends as one of a full screen interstitial advertisement or large video advertisement. The data processing system can select a content item based on the intent index (ACT 540). The content item selected can be associated with the content provider or content publisher, or any other entity associated with either the content provider or the content publisher. The data processing system can provide the content item for display at the according to the content item serving parameter (ACT 545).

Figure 6:
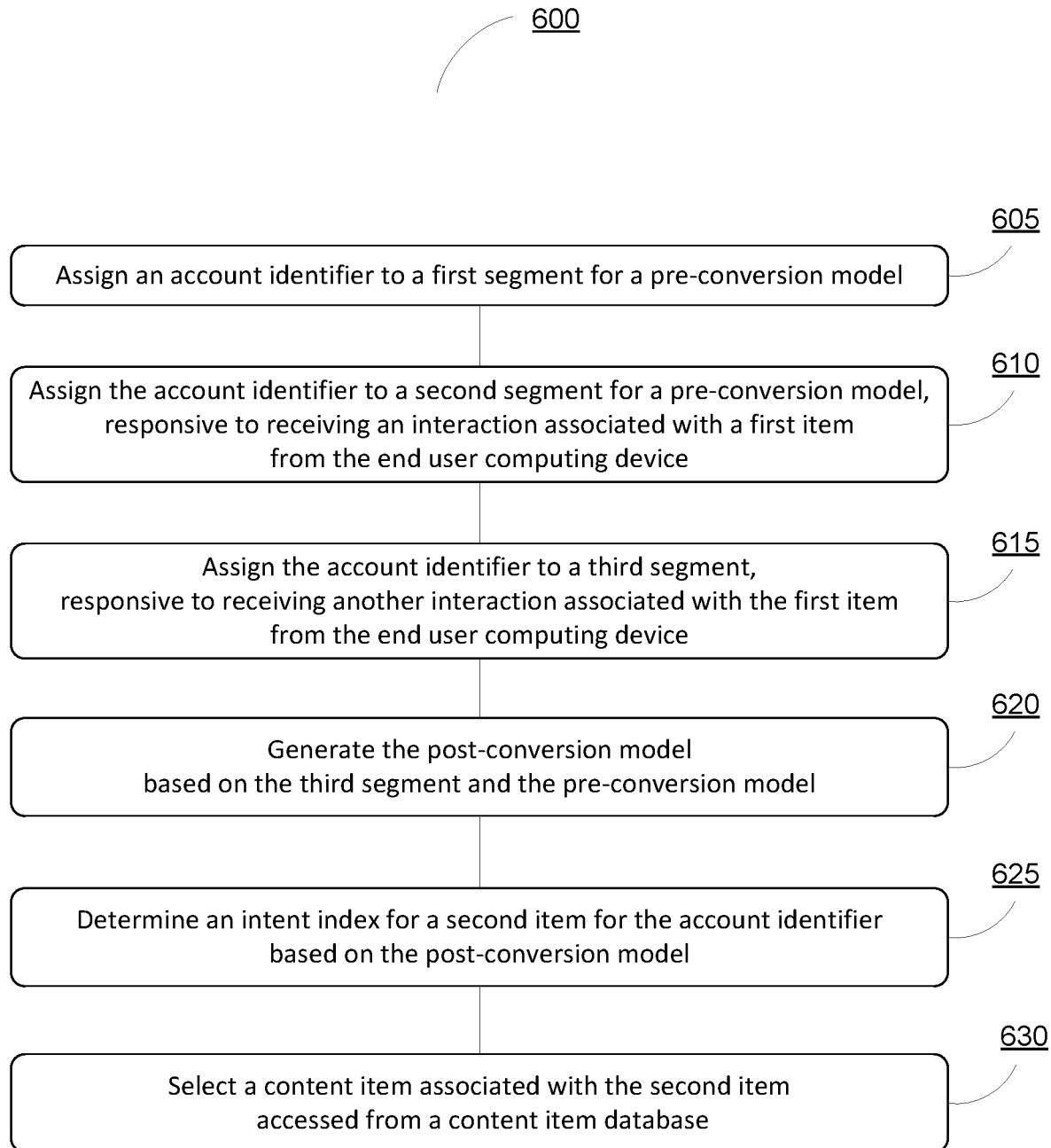
FIG. 6 is a flow diagram depicting a method of re-messaging with alternative content items based on tracking client device interactions with content items associated with the content provider, according to an illustrative implementation.

Referring to FIG. 6, FIG. 6 is a flow diagram or method 600 depicting a method of re-messaging with alternative content items based on tracking client device interactions with content items associated with the content provider, according to an illustrative implementation. The functionality described herein with respect to method 600 can be performed or otherwise executed by the data processing system 110 or the various modules of the data processing system 110 shown in FIG. 1.

The data processing system can assign an account identifier to a first segment for a pre-conversion model (ACT 605). The data processing system can assign the account identifier to the first segment for the pre-conversion model, responsive to receiving a first interaction from the client device. An account identifier can include any identifier used to identify a user. For example, the account identifier can include an email, account number, or randomly generated numerical identifier. The account identifier can be associated with one or more end user computing devices. The first interaction can be associated to a content provider. For example, the first interaction can include an impression of an advertisement created by the content provider shown on a webpage hosted by the content publisher. The first interaction can also be associated with a first item of the content provider. The first item can include a product, good, or service, or a plurality thereof, advertised by the content provider. For example, the first interaction can be associated with a line of headphone sets advertised by a digital audio provider. The first segment can include the general user segment. The general user segment can be stored and accessed from the database. For example, the general user segment may be over all users that have had an interaction with the content provider.

The data processing system can assign the account identifier to a second segment for the pre-conversion model, responsive to receiving a second interaction from the client device (ACT 610). The second segment can include a subset of the first segment. The data processing system can determine that the second interaction is one of a specified, predetermined, or otherwise plurality of interactions. The data processing system can assign the account identifier to the second segment for the pre-conversion model, responsive to determining that the second interaction is one of the specified, predetermined, or otherwise plurality of interactions. The plurality of interactions can include, for example, mouse-hover over a content item associated with the content provider, muting an audio or audiovisual content item associated with the content provider, visits or revisits of a webpage or website of the content provider or content publisher, visits or revisits of a webpage or website containing information about the content provider, use of search queries containing terms associated with the content provider, writing reviews about the content provider on webpages or websites such as social networking websites, making purchase orders online or offline for products or services associated with the content provider, and visits of a physical store location associated with the content provider, among others. The second interaction can also be associated with the first item of the content provider. The first item can include a product, good, or service, or a plurality thereof, advertised by the content provider. The second segment can define a subset user segment that may be associated with a particular location identifier, interaction type, device type of, or applications used on the, among others. For example, the second segment may define the user segment associated with location identifiers with the zip code 90210 and associated with tablets as the device type of the end user computing devices.

The data processing system can receive account data. The account data can include location identifier of the associated with the account identifier, information inputted by the user associated with the account identifier, and device type or specifications of the, among others. The data processing system can assign the account identifier to the second segment for the pre-conversion model, responsive to receiving the account data associated with the account identifier. The data processing system can select the second segment from one or more segments for the pre-conversion model based on the account data, responsive to receiving the account data associated with the account identifier. The data processing system can assign the account identifier to the second segment for the pre-conversion model, responsive to the selection from the one or more segments for the pre-conversion model.

The data processing system can assign the account identifier to a third segment, responsive to receiving a third interaction from the end user computing device (ACT 615). The third interaction can include a conversion event associated with the content provider. The third segment can be indicative of the conversion event. The third segment can also include a subset of the first segment or the second segment. The data processing system can determine that the third interaction is a conversion event. The data processing system can access a list of predefined conversion events from the database. The list of predefined conversion events can be defined by the content provider or content publisher. The list of predefined conversion events can include placement of an order for a product or service associated with the content provider or content publisher, and visit of the physical store location associated with the content provider or content publisher, among others. The list of predefined conversion events can also include a plurality of interactions, including for example, mouse-hover over a content item associated with the content provider, muting an audio or audiovisual content item associated with the content provider, visits or revisits of a webpage or website of the content provider or content publisher, visits or revisits of a webpage or website containing information about the content provider, use of search queries containing terms associated with the content provider, writing reviews about the content provider on webpages or websites such as social networking websites, making purchase orders online or offline for products or services associated with the content provider, and visits of a physical store location associated with the content provider, among others. The third interaction can also be associated with the first item of the content provider. The first item can include a product, good, or service, or a plurality thereof, advertised by the content provider. The third segment can define a subset user segment that may be associated with a particular location identifier, interaction type, device type of, or applications used on the, among others. For example, the third segment may define the user segment associated with location identifiers with the State of California associated with smartphones as the device type of the end user computing devices that have converted. The list of predefined conversion events can also include interactions determined to have a statistically significant influence on the intent index. The data processing system can determine that the third interaction is a conversion event based on the list of predefined conversion events.

The data processing system can generate a post-conversion model based on the third segment and the pre-conversion model (ACT 620). The data processing system can segment, divide, partition, or otherwise limit a first segment subset and a second segment subset. The first segment subset and the second segment subset each can include the subset of the first segment that converted and the subset of the second segment that converted respectively. The first segment subset and the second segment subset each can include the subset of the first segment that have done the same interaction as the third interaction and the subset of the second segment that have done the same interaction as the third interaction respectively. The data processing system can determine, measure, estimate or otherwise calculate a first influence measure for the subset of the first segment that converted and a second influence measure for the subset of the second segment that converted.

The data processing system can maintain the pre-conversion model. The pre-conversion model can include one or more interaction terms. Each of the interaction terms can correspond with a respective segment. Each of the interaction terms can include an intent index associated with the particular segment. The pre-conversion model can be implemented using, for example, an artificial neural network. This artificial neural network can include a plurality of input nodes, a plurality of hidden nodes, and a plurality of output nodes. Each input node can correspond to a different user segment and each can have the input of intent index fed back for the respective segment and exogenous factors. Exogenous factors can include, for example, time of day, day of week, holidays, changes in weather patterns, and stock prices, among others. Each output node can correspond to different user segment and output the intent index for the corresponding user segment. The weights for the connections between the nodes can be predefined or adaptively or iteratively tuned based on error propagation. Using the interaction terms, the pre-conversion model can also be implemented using, for example, linear regression, analysis of variance (ANOVA), Bayesian learning, deep learning, and other statistical machine learning techniques.

The data processing system can determine a third interaction term, responsive to assigning the account identifier to the third segment. The data processing system can generate the post-conversion model based on the one or more interaction terms. The data processing system can generate the post-conversion model based a function of the one or more interaction terms. The data processing system can determine or otherwise generate the post-conversion model, responsive to receiving a fourth interaction from the or responsive to assigning the account identifier to a fourth segment. For example, suppose there are two user segments corresponding to two interactions by the end user computing devices associated with the account identifier prior to the conversion event. In this example, the data processing system can determine the statistical influence measures of each of the interaction terms to the intent index. The data processing system can also wait until more interactions from the are received to gather more information about the account identifier in order to calculate higher order interaction terms between the two user segments. The data processing system can then determine or generate the post-conversion model based on determining the statistical influence measures of each of the interaction terms to the intent index.

The data processing system can determine or attribute which one of the previous interactions lead to the conversion event based on the post conversion model. The data processing system can rank the one or more interaction terms of the post-conversion model. The data processing system can determine, select, or otherwise identify the interaction event associated with the interaction term with the highest influence measure as the interaction event that lead to the conversion event. The data processing system can determine the interaction term with the highest influence measure based on an F-Test, T-Test, or any other statistical inference technique. For example, suppose the p-value for the first user segment is 75.3%, for the second user segment is 30.7%, for the third user segment is 32.1%, and for the fourth user segment is 3.8%. In this example, the data processing system can rank the interaction terms and determine that the fourth interaction term corresponding to the fourth user segment is the one with the highest influence measure. The data processing system can also identify the interaction event associated with the fourth user segment and the interaction term as the one that lead to the conversion event.

The data processing system can determine an intent index for the second item for the account identifier based on the post-conversion model (ACT 625). The post-conversion model may have been generated for the first item. The data processing system can determine the intent index for the second item for each of the segments associated with the account identifier. The data processing system can determine the statistical influence for one or more interaction terms for the intent index for the second item. The data processing system can generate the intent index based on a statistical aggregation, weighted sum, or otherwise a function of the one or more interaction terms of the post-conversion model for the second item. For example, suppose the user has converted by purchasing an airplane ticket to a popular holiday destination, the first item for the content provider. Further suppose that the account identifier for the user has been assigned to the general user segment, the user segment that visited the webpage of the tourism board of the destination, and the user segment that made a purchase order for the airplane ticket on the webpage of the content provider. In this example, if the second item were a local museum in the popular holiday destination, the data processing system can determine the intent indices for the local museum for each of the user segments that the account identifier has been assigned to using machine learning algorithms. The data processing system can then determine the determine intent index for the account identifier by aggregating or amalgamating the intent indices for the local museum. The data processing system can generate the intent index for the second item for the account identifier even before conversion based on the post-conversion model generated for the first item.

The data processing system can select the second item based on the intent indices for one or more items. The data processing system can determine the intent indices for each of the one or more items. The data processing system can determine the intent index for the respective item based on the post-conversion model for the respective item. The data processing system can rank the one or more items based on the respective intent index. The data processing system can select the item with the highest intent index as the second item.

The data processing system can select a content item accessed from a content item database based on the second item (ACT 630). The content item can be associated with the second item. The content item database can include database or a database associated with the content provider or content publisher. The content item database accessed for the second item can include a database different from the one accessed for the first item. The data processing system can identify a second content provider based on one or more user segments, such as the first user segments, the second user segment, and the third user segment. The second content provider can be different from the first content provider. The second content provider may share the same or similar user segments as the first content provider.

The data processing system can assign the account identifier to a fourth segment for the pre-conversion model, responsive to receiving a fourth interaction from the. The data processing system can generate the post-conversion based on the fourth interaction. The fourth segment can include a subset of the first segment. Subsequent to determining the intent index for the second item, the data processing system can determine that the intent index for a third item of the one or more items may be greater than the intent index for the second item based on the post-conversion model. The data processing system can determine that the intent index for the third item may be greater than the intent index for the second item by a predefined threshold. The data processing system can select another content item associated with the third item, responsive to determining that the intent index for the third item is greater than the intent index for the second item. For example, suppose the second item originally selected by the data processing system was a lawnmower. Further suppose that the interactions received by the data processing system thereafter were with websites for waterskies and using the updated post-conversion model, the data processing system has determined that the intent index for waterskies is greater than the intent index for lawnmowers. In this example, the data processing system can select content items for waterskies to provide for display at the end user computing device.

Figure 7:
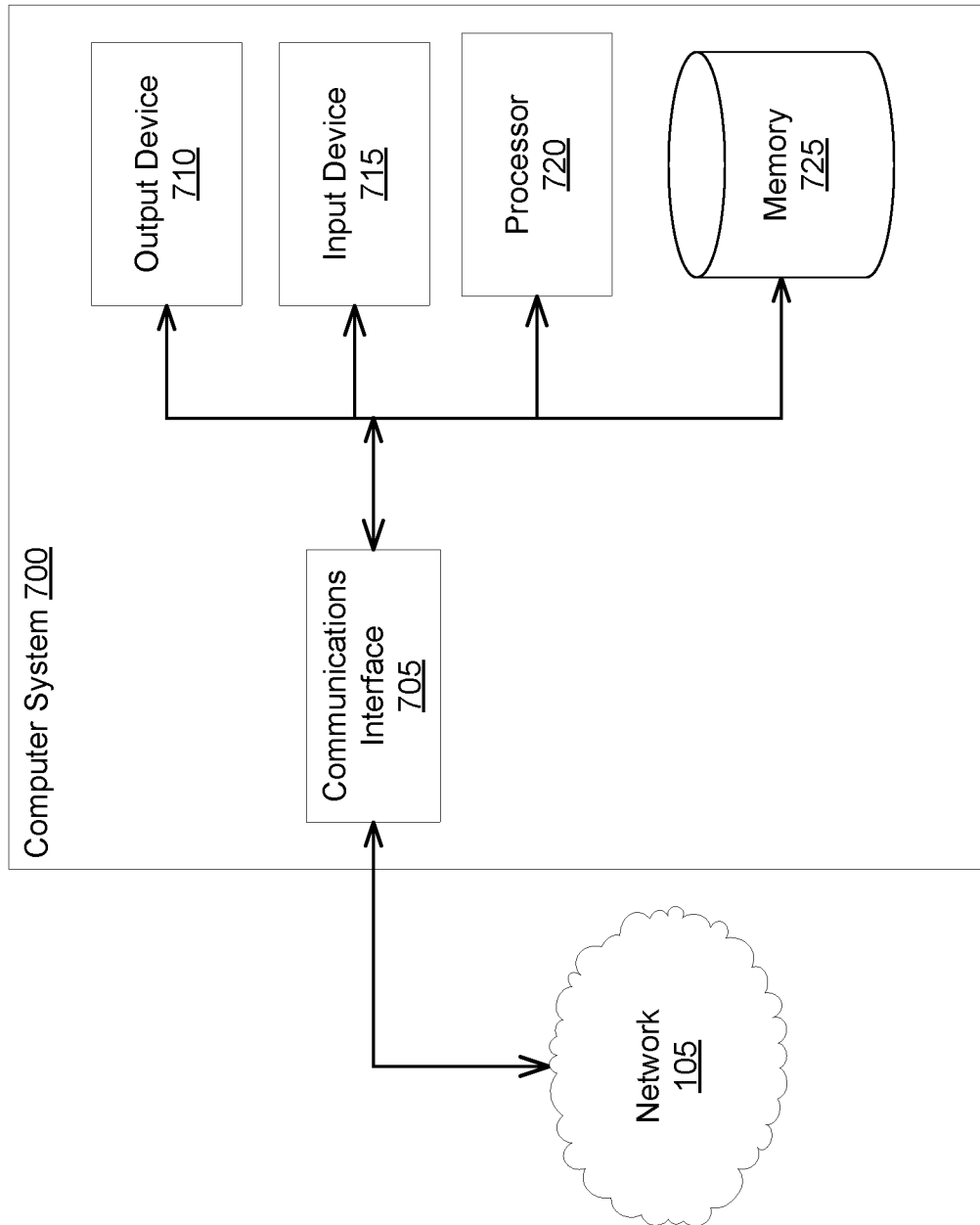
FIG. 7 is a block diagram illustrating a general architecture for a computer system that may be employed to implement elements of the systems and methods described and illustrated herein, according to an illustrative implementation.

FIG. 7 shows the general architecture of an illustrative computer system 700 that may be employed to implement any of the computer systems discussed herein (including the system 100 and its components such as the data processing system 110, the interaction cataloguer module 130, the intent predictor module 135, or content item provider module 140, in accordance with some implementations. The computer system 700 can be used to provide information via the network 105, for example to determine a status of the end user computing device 125. The computer system 700 includes one or more processors 720 communicatively coupled to at least one memory 725, one or more communications interfaces 705, and one or more output devices 710 (e.g., one or more display units) and one or more input devices 715. The processors 720 can be included in the data processing system 110 or the other components of the system 100 such as the interaction cataloguer module 130, the intent predictor module 135, or the content item provider module 140.

The memory 725 can include computer-readable storage media, and can store computer instructions such as processor-executable instructions for implementing the operations described herein. The interaction cataloguer module 130, the intent predictor module 135, content item provider module 140, or the database 145 can include the memory 725 to store content items, content item serving parameters, intent index, intent index trajectories, and plurality of interactions, among others. The processor(s) 720 can execute instructions stored in the memory 725 and can read from or write to the memory information processed and or generated pursuant to execution of the instructions.

The processors 720 can be communicatively coupled to or control the communications interface(s) 705 to transmit or receive information pursuant to execution of instructions. For example, the communications interface(s) 705 can be coupled to a wired or wireless network, bus, or other communication means and can allow the computer system 700 to transmit information to or receive information from other devices (e.g., other computer systems). One or more communications interfaces 705 can facilitate information flow between the components of the system 100. In some implementations, the communications interface(s) can be configured (e.g., via hardware components or software components) to provide a website as an access portal to at least some aspects of the computer system 700. Examples of communications interfaces 705 include user interfaces.

The output devices 710 can allow information to be viewed or perceived in connection with execution of the instructions. The input device(s) 715 can allow a user to make manual adjustments, make selections, enter data or other information, or interact in any of a variety of manners with the processor during execution of the instructions.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing system" or "computing device" "module" "engine" "component" or "computing device" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field, programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The interaction cataloguer module 130, the intent predictor module 135, or the content item provider module 140 can include or share one or more data processing apparatuses, systems, computing devices, or processors.

A computer program (also known as a program, software, software application, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that, store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing, system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN") an inter-network (e.g., the Internet), and peer-to-peer networks (e.g., ad hoc peer-to-peer networks).

The computing system such as system 100 or system 700 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g, for purposes of displaying data to and receiving user input from a user interacting with the client device). Data generated at the client device (e.g., a result of the user interaction) can be received from the client device at the server.

While operations are depicted in the drawings in a particular order, this should not be understood as requiring that such operations be performed in the particular order shown or in sequential order, or that all illustrated operations are required to be performed. Actions described herein can be performed in a different order.

The separation of various system components does not require separation in all implementations, and the described program components can be included in a single hardware or software product. For example, the interaction cataloguer module 130, the intent predictor module 135, the content item provider module 140 can be a single module, a logic device having one or more processing circuits, or part of an online content item placement system.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of dynamically varying an intensity of providing content items based on client device interactions, comprising:
    determining, by one or more data processing apparatus, that an account identifier of a given user is included in a list for a given content provider;
    detecting, by the one or more data processing apparatus, one or more user interactions of the given user with one or more content items of the given content provider; and
    varying, by the one or more data processing apparatus, a frequency of content item delivery to one or more other users different from the given user, including:
        adjusting a trajectory of an intent index value for account identifiers in the list based on the detected one or more user interactions; and
        adjusting the frequency at which content items of the given content provider are delivered to users corresponding to the account identifiers in the list over time based on the adjusted trajectory; and
    sending, over a data communication network, the content items of the given content provider to client devices of the users corresponding to the account identifiers in the list for display to the users according to the adjusted frequency.

2. The method of claim 1, wherein the account identifier for the given user is included in the list for the given content provider based on an intent index value for the given user calculated using historical interactions performed by the given user.

3. The method of claim 1, wherein the list comprises multiple user segments that each include respective account identifiers for a subset of the users having account identifiers in the list and wherein each user segment has a corresponding intent index value.

4. The method of claim 3, comprising reassigning the given user from a first user segment to a second user segment of the list based on the one or more user interactions of the given user with the one or more content items of the given content provider.

5. The method of claim 3, comprising updating the intent index value for each user segment based on user interactions of the subset of the users in the user segment with the one or more content items of the given content provider.

6. The method of claim 5, wherein updating the intent index value for each user segment comprises processing a respective model for each user segment using the user interactions of the subset of the users in the user segment.

7. The method of claim 5, comprising adjusting a respective frequency of content item delivery to the users of each user segment based on changes in the corresponding user intent index value for the user segment.

8. A system for dynamically varying an intensity of providing content items based on client device interactions, the system comprising:
   one or more processors; and
   one or more storage devices storing instructions that, when executed by the one or more processors, cause the one or more processors to perform operations comprising:
      determining that an account identifier of a given user is included in a list for a given content provider;
      detecting one or more user interactions of the given user with one or more content items of the given content provider; and
      varying a frequency of content item delivery to one or more other users different from the given user, including:
         adjusting a trajectory of an intent index value for account identifiers in the list based on the detected one or more user interactions; and
         adjusting the frequency at which content items of the given content provider are delivered to users corresponding to the account identifiers in the list over time based on the adjusted trajectory; and
      sending, over a data communication network, the content items of the given content provider to client devices of the users corresponding to the account identifiers in the list for display to the users according to the adjusted frequency.

9. The system of claim 8, wherein the account identifier for the given user is included in the list for the given content provider based on an intent index value for the given user calculated using historical interactions performed by the given user.

10. The system of claim 8, wherein the list comprises multiple user segments that each include respective account identifiers for a subset of the users having account identifiers in the list and wherein each user segment has a corresponding intent index value.

11. The system of claim 10, wherein the operations comprise reassigning the given user from a first user segment to a second user segment of the list based on the one or more user interactions of the given user with the one or more content items of the given content provider.

12. The system of claim 10, wherein the operations comprise updating the intent index value for each user segment based on user interactions of the subset of the users in the user segment with the one or more content items of the given content provider.

13. The system of claim 12, wherein updating the intent index value for each user segment comprises processing a respective model for each user segment using the user interactions of the subset of the users in the user segment.

14. The system of claim 13, wherein the operations comprise adjusting a respective frequency of content item delivery to the users of each user segment based on changes in the corresponding user intent index value for the user segment.

15. A non-transitory computer readable medium storing instructions that, upon execution by one or more data processing apparatus, cause the one or more data processing apparatus to perform operations comprising:
   determining that an account identifier of a given user is included in a list for a given content provider;
   detecting one or more user interactions of the given user with one or more content items of the given content provider; and
   varying a frequency of content item delivery to one or more other users different from the given user, including:
      adjusting a trajectory of an intent index value for account identifiers in the list based on the detected one or more user interactions; and
      adjusting the frequency at which content items of the given content provider are delivered to users corresponding to the account identifiers in the list over time based on the adjusted trajectory; and
   sending, over a data communication network, the content items of the given content provider to client devices of the users corresponding to the account identifiers in the list for display to the users according to the adjusted frequency.

16. The non-transitory computer readable medium of claim 15, wherein the account identifier for the given user is included in the list for the given content provider based on an intent index value for the given user calculated using historical interactions performed by the given user.

17. The non-transitory computer readable medium of claim 15, wherein the list comprises multiple user segments that each include respective account identifiers for a subset of the users having account identifiers in the list and wherein each user segment has a corresponding intent index value.

18. The non-transitory computer readable medium of claim 17, wherein the operations comprise reassigning the given user from a first user segment to a second user segment of the list based on the one or more user interactions of the given user with the one or more content items of the given content provider.

19. The non-transitory computer readable medium of claim 17, wherein the operations comprise updating the intent index value for each user segment based on user interactions of the subset of the users in the user segment with the one or more content items of the given content provider.

20. The non-transitory computer readable medium of claim 19, wherein updating the intent index value for each user segment comprises processing a respective model for each user segment using the user interactions of the subset of the users in the user segment.

* * * * *